(12) United States Patent
Kazuno et al.

(10) Patent No.: US 10,358,049 B2
(45) Date of Patent: Jul. 23, 2019

(54) METHOD FOR CONTROLLING FUEL CELL VEHICLE, AND FUEL CELL VEHICLE

(71) Applicant: HONDA MOTOR CO., LTD., Tokyo (JP)

(72) Inventors: Shuichi Kazuno, Wako (JP); Hibiki Saeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 467 days.

(21) Appl. No.: 15/169,744

(22) Filed: Jun. 1, 2016

(65) Prior Publication Data

US 2016/0375792 A1     Dec. 29, 2016

(30) Foreign Application Priority Data

Jun. 25, 2015   (JP) .................. 2015-127188

(51) Int. Cl.
| B60L 11/18 | (2006.01) |
|---|---|
| H01M 8/04992 | (2016.01) |
| B60L 53/20 | (2019.01) |
| B60L 50/72 | (2019.01) |
| B60L 58/31 | (2019.01) |
| B60L 58/40 | (2019.01) |

(52) U.S. Cl.
CPC .......... *B60L 11/1887* (2013.01); *B60L 50/72* (2019.02); *B60L 53/20* (2019.02); *B60L 58/31* (2019.02); *B60L 58/40* (2019.02); *H01M 8/04992* (2013.01); *H01M 2250/20* (2013.01); *Y02T 10/7072* (2013.01); *Y02T 90/127* (2013.01); *Y02T 90/14* (2013.01); *Y02T 90/32* (2013.01); *Y02T 90/34* (2013.01)

(58) Field of Classification Search
CPC .................................................. B60L 11/1887
See application file for complete search history.

(56) References Cited

U.S. PATENT DOCUMENTS

| 2007/0199747 A1* | 8/2007 | Aoyagi | ............... B60L 11/1861 |
| | | | 180/65.31 |
| 2007/0275276 A1* | 11/2007 | Saeki | .................. B60L 11/1887 |
| | | | 429/431 |
| 2010/0104906 A1* | 4/2010 | Hirakawa | ........... B60L 11/1887 |
| | | | 429/429 |

FOREIGN PATENT DOCUMENTS

JP       2007-157478       6/2007

* cited by examiner

*Primary Examiner* — Fritz M Fleming
(74) *Attorney, Agent, or Firm* — Mori & Ward, LLP

(57) ABSTRACT

A method for controlling a fuel cell vehicle includes: calculating total system power for the fuel cell vehicle; calculating power accumulation device target power; calculating fuel cell target power, the power accumulation device target power and the fuel cell target power satisfying the total system power; controlling a first converter to regulate power of a power accumulation device based on the power accumulation device target power, the first converter being provided between the power accumulation device and a motor driver, the motor driver being to drive a motor to generate travelling power; and controlling a second converter to regulate power generated by the fuel cell based on the fuel cell target power, the second converter being provided between the fuel cell and the motor driver.

15 Claims, 12 Drawing Sheets

# METHOD FOR CONTROLLING FUEL CELL VEHICLE, AND FUEL CELL VEHICLE

CROSS-REFERENCE TO RELATED APPLICATIONS

The present application claims priority under 35 U.S.C. § 119 to Japanese Patent Application No. 2015-127188, filed Jun. 25, 2015, entitled "Method for Controlling Fuel Cell Vehicle, and Fuel Cell Vehicle." The contents of this application are incorporated herein by reference in their entirety.

BACKGROUND

1. Field

The present disclosure relates to a method for controlling a fuel cell vehicle, and a fuel cell vehicle.

2. Description of the Related Art

Japanese Unexamined Patent Application Publication No. 2007-157478 discloses a fuel cell vehicle (see FIG. 7 in Japanese Unexamined Patent Application Publication No. 2007-157478).

In the fuel cell vehicle disclosed in Japanese Unexamined Patent Application Publication No. 2007-157478, a determination is made as to whether or not an electrode catalyst of a fuel cell is in a poisoned state, and if a determination is made that the fuel cell is at an operation point in a relatively high-voltage/low-current region in which the fuel cell continues its poisoned state, the operation point is shifted to a low-voltage/high-current region (or a low-efficiency region) in order to recover cell characteristics (refer to paragraphs [0023] and [0027] and FIG. 2 in Japanese Unexamined Patent Application Publication No. 2007-157478).

At the operation points in the high-voltage/low-current region and the low-voltage/high-current region mentioned above, the amount of change in voltage relative to a change in current is large, and at any of the operation points, electric power of the fuel cell is relatively small power.

Thus, Japanese Patent Application Publication No. 2007-157478 discloses that control is performed so that a motor is driven by combined power of the fuel cell and a power accumulation device in a situation where traveling power of the motor becomes large, which needs large power (refer to paragraph [0054] and FIGS. 7 and 1 in Japanese Unexamined Patent Application Publication No. 2007-157478).

SUMMARY

According to one aspect of the present invention, a method for controlling a fuel cell vehicle includes: calculating total system power for the fuel cell vehicle; calculating power accumulation device target power; calculating fuel cell target power, the power accumulation device target power and the fuel cell target power satisfying the total system power; controlling a first converter to regulate power of a power accumulation device based on the power accumulation device target power, the first converter being provided between the power accumulation device and a motor driver to convert a voltage discharged by the power accumulation device into a voltage supplied to the motor driver and to convert a voltage outputted by the motor driver to a voltage supplied to the power accumulation device, the motor driver being to drive a motor to generate travelling power; and controlling a second converter to regulate power generated by a fuel cell based on the fuel cell target power, the second converter being provided between the fuel cell and the motor driver to convert a voltage generated by the fuel cell to a voltage supplied to the motor driver.

According to another aspect of the present invention, a fuel cell vehicle includes a fuel cell, a power accumulation device, a motor, a motor driver, a first converter, a second converter, a system power calculator, a power accumulation device target power calculator, a fuel cell target power calculator, a power accumulation device power controller, and a fuel cell power controller. The motor is to generate travelling power. The motor driver is to drive the motor. The first converter is connected between the power accumulation device and the motor driver to convert a voltage discharged by the power accumulation device into a voltage supplied to the motor driver and to convert a voltage outputted by the motor driver to a voltage supplied to the power accumulation device. The second converter is connected between the fuel cell and the motor driver to convert a voltage generated by the fuel cell into a voltage supplied to the motor driver. The system power calculator is to calculate total system power for the fuel cell vehicle. The power accumulation device target power calculator is to calculate power accumulation device target power. The fuel cell target power calculator is to calculate fuel cell target power, the power accumulation device target power and the fuel cell target power satisfying the total system power. The power accumulation device power controller is to control the first converter to regulate power of the power accumulation device based on the power accumulation device target power. The fuel cell power controller is to control the second converter to regulate power generated by the fuel cell based on the fuel cell target power.

According to further aspect of the present invention, a fuel cell vehicle includes a fuel cell, a power accumulation device, a motor, a motor driver, a first converter, and a second converter. The motor is to generate travelling power. The motor driver is to drive the motor. The first converter is connected between the power accumulation device and the motor driver to control a primary side voltage of the first converter to convert a voltage discharged by the power accumulation device into a voltage supplied to the motor driver and to convert a voltage outputted by the motor driver to a voltage supplied to the power accumulation device. The second converter is connected between the fuel cell and the motor driver to control a secondary side voltage of the second converter to convert a voltage generated by the fuel cell into a voltage supplied to the motor driver.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
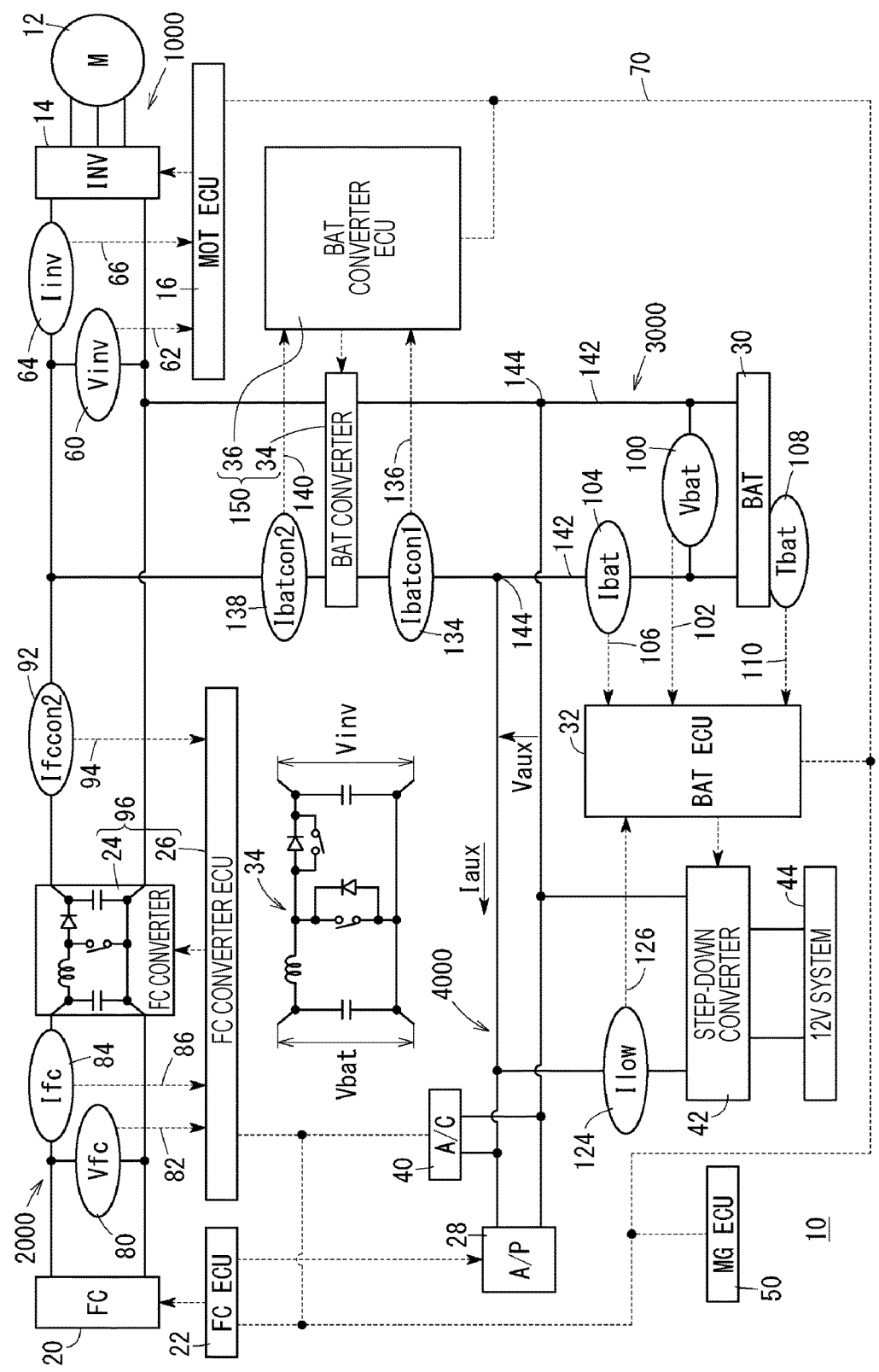
FIG. 1 is a schematic block diagram of an overall configuration of a fuel cell vehicle according to an embodiment.

The embodiments will now be described with reference to the accompanying drawings, wherein like reference numerals designate corresponding or identical elements throughout the various drawings.

Description will be given below with reference to the accompanying drawings with regard to a method for controlling a fuel cell vehicle of the present disclosure, by providing a preferable embodiment by way of example in the context of a fuel cell vehicle in which the method is carried out.

FIG. 1 illustrates a schematic block diagram of an overall configuration of a fuel cell vehicle 10 (hereinafter, also called an "FC vehicle 10" or a "vehicle 10") according to the embodiment.

The FC vehicle 10 includes a drive system 1000, a fuel cell system 2000 (hereinafter, also called an "FC system"), a battery system 3000, an auxiliary machinery system 4000, and a management electronic control unit 50 (hereinafter, also called a "management ECU 50" or an "MG ECU 50") configured to perform management control on these "systems".

In this case, the fuel cell system 2000 and the battery system 3000 basically function as a power supply device of the entire vehicle 10, and the drive system 1000 and the auxiliary machinery system 4000 basically function as a load to consume electric power supplied from the above-mentioned power supply device (or the fuel cell system 2000 and the battery system 3000).

The drive system 1000 includes a travel motor 12 (hereinafter, also called a "motor 12" or a "drive motor 12"), an inverter 14 to act as a motor drive unit, and a motor electronic control unit 16 (hereinafter, also called a "motor ECU 16" or an "MOT ECU 16").

The FC system 2000 includes a fuel cell stack 20 (hereinafter called an "FC 20" or an "FC stack 20"), a fuel cell electronic control unit 22 (hereinafter called an "FC ECU 22"), a fuel cell converter 24 (hereinafter called an "FC converter 24"), an FC converter electronic control unit 26 (hereinafter called an "FC converter ECU 26" or an "ECU 26"), and an air pump 28.

A circuit configuration of the FC converter 24 is a chopper type step-up converter (or a step-up voltage converter) formed of a choke coil, a diode, a switching element (or a transistor), and a smoothing capacitor, for example as illustrated in a block of the FC converter 24 in FIG. 1.

The battery system 3000 includes a battery 30 (hereinafter, also called a "BAT") to act as a power accumulation device, a battery electronic control unit 32 (hereinafter called a "battery ECU 32" or a "BAT ECU 32"), a battery converter 34 (hereinafter, also called a "BAT converter 34"), and a battery converter electronic control unit 36 (hereinafter, also called a "battery converter ECU 36" or a "BAT converter ECU 36").

As illustrated in a margin in FIG. 1, a circuit configuration of the BAT converter 34 is such that the switching element is arranged in parallel with the diode in the circuit of the FC converter 24 and an antiparallel diode extending from a low-voltage side toward a high-voltage side is arranged in parallel with the switching element in the circuit of the FC converter 24. The BAT converter 34 functions as a step-up converter (or a step-up voltage converter) configured to step up a voltage Vbat on the battery 30 side (or a battery voltage) and apply the voltage as an inverter terminal voltage Vinv to an input terminal of the inverter 14, or as a step-down converter (or a step-down voltage converter) configured to step down the inverter terminal voltage Vinv generated at the input terminal of the inverter 14 and apply the voltage to the battery 30. In other words, the BAT converter 34 functions as what is called a chopper type step-up/step-down converter (or a step-up/step-down voltage converter).

The auxiliary machinery system 4000 includes an air conditioner 40, a step-down converter 42, and a 12V system 44, as auxiliary machinery, in addition to the air pump 28. A power supply of the 12V system 44 is supplied as a power supply or the like for various ECUs such as the MG ECU 50.

Here, the motor 12 and the inverter 14 in the drive system 1000, which are configured to generate traveling power, are main machinery in the vehicle 10 and are collectively called a "motor load", and electric power required for the "motor load" is called inverter terminal power Pinvreq (also called requested inverter terminal power) (where Pinvreq [kW] =Iinvreq [A]×Vinvreq [kV]).

Moreover, the auxiliary machinery system 4000 is called an "auxiliary machinery load", and electric power required for the auxiliary machinery load is called requested auxiliary machinery power Pauxreq (where Pauxreq [kW]=Iauxreq [A]×Vauxreq [kV]). The requested inverter terminal power Pinvreq and the requested auxiliary machinery power Pauxreq are collectively called requested power for the entire FC vehicle 10, or equivalently, requested system power (total system power) Psysreq (where Psysreq [kW] =Pinvreq [kW]+Pauxreq [kW]).

When the "motor load" is driven by electric power supplied from the FC 20 and the battery 30 (FC power Pfc+battery power Pbat), the motor 12 generates drive power as the traveling power. Wheels (not illustrated) are rotated through a transmission (not illustrated) by the drive power, so that the FC vehicle 10 travels.

The inverter 14 is a bidirectional DC-AC converter. When the motor 12 is accelerated, the inverter 14 converts the inverter terminal voltage Vinv as a DC voltage generated at the input terminal of the inverter 14 by the FC 20 and/or the battery 30, into a three-phase AC voltage, and applies the voltage to the motor 12. When the motor 12 is decelerated (or regenerated), the inverter 14 also converts AC regenerative power generated in the motor 12 into the DC inverter terminal voltage Vinv and inverter terminal current Iinv. The battery 30 is charged by electric power (or the regenerative power) Preg [kW] generated by regeneration of the motor 12 (where Preg=Vinv×Iinv).

The inverter terminal voltage Vinv also serving as a secondary side voltage of the FC converter 24 and the BAT converter 34 is detected by a voltage sensor 60 and is outputted via a signal line 66 to the motor ECU 16. The inverter terminal current Iinv as an input terminal current of the inverter 14 is detected by a current sensor 64 and is outputted via a signal line 62 to the motor ECU 16.

The motor ECU 16 controls the motor 12 and the inverter 14, based on an input value such as a command value from the management ECU 50. Moreover, the motor ECU 16 outputs values such as the inverter terminal voltage Vinv, the inverter terminal current Iinv, and the inverter terminal power Pinv [kW] (Vinv×Iinv) to a communication network 70 as an in-vehicle communication network constructed of an in-vehicle LAN (local area network) or the like.

The motor ECU 16 includes an input/output device, a calculation device, and a storage device, which are not illustrated. The same goes for the other ECUs.

For example, the FC 20 has a structure in which fuel cells, which are each formed by sandwiching a solid polymer electrolyte membrane at both sides in between an anode electrode and a cathode electrode, are stacked one on top of another. An anode system, a cathode system, a cooling system and the like are included in a periphery of the FC 20. The anode system feeds and discharges hydrogen (or a fuel gas) to and from the anode of the FC 20. The cathode system feeds and discharges air containing oxygen (or an oxidizer gas) to and from the cathode of the FC 20. The cooling system cools the FC 20. Exclusive of the air pump 28 and the FC ECU 22, the anode system, the cathode system and the cooling system are omitted from FIG. 1.

The FC ECU 22 controls generation of electric power by the FC 20, as a whole, such as the supply of the hydrogen and the air to the FC 20, based on an input value such as a command value from the management ECU 50. In other words, the FC ECU 22 controls the anode system, the cathode system, and the cooling system. The FC ECU 22 transmits electric power Pap [kW] consumed by the air pump 28 to the management ECU 50, the FC converter ECU 26 or the like via the communication network 70.

The FC converter 24 is disposed between the FC 20 and the inverter 14. In other words, the FC converter 24 is connected at its primary side to the FC 20 and is connected at its secondary side to the motor 12 via the inverter 14 and also to the battery 30 and the auxiliary machinery system 4000 via the BAT converter 34.

The FC converter 24 steps up or connects directly to an output voltage of the FC 20 (hereinafter called an "FC voltage Vfc") (or turns off the switching element in the FC converter 24), and supplies the voltage to the secondary side (or the inverter 14 side which forms the drive system 1000, the auxiliary machinery system 4000 side, and/or the battery 30 side).

During direct connection, a switching loss of the FC converter 24 has a zero value, which thus increases system efficiency $\eta$sys of the entire FC vehicle 10.

The FC voltage Vfc as a primary side voltage of the FC converter 24 is detected by a voltage sensor 80 and is outputted via a signal line 82 to the FC converter ECU 26. An FC current Ifc as a primary side current of the FC converter 24 is detected by a current sensor 84 and is outputted via a signal line 86 to the FC converter ECU 26. The secondary side voltage of the FC converter 24 is detected as the inverter terminal voltage Vinv by the voltage sensor 60. A secondary side current Ifccon2 of the FC converter 24 is detected by a current sensor 92 and is outputted via a signal line 94 to the FC converter ECU 26.

The FC converter ECU 26 controls the FC 20 via the FC converter 24, based on an input value such as a command value from the management ECU 50. Hereinafter, the FC converter 24 and the FC converter ECU 26 will also be collectively called an "FC VCU 96", which means a voltage control unit for the FC 20.

The input values to the FC converter ECU 26 include an input value inputted directly to the FC converter ECU 26, and an input value inputted thereto via the communication network 70.

The battery 30 is a power accumulation device (or an energy storage) including plural battery cells, and a lithium ion secondary battery, a nickel hydrogen secondary battery, or the like, may be utilized as the battery 30. In a first embodiment, the lithium ion secondary battery is utilized. A power accumulation device such as a capacitor may also be used in place of the battery 30.

The battery voltage Vbat [V] as an input/output terminal voltage of the battery 30 is detected by a voltage sensor 100 and is outputted via a signal line 102 to the BAT ECU 32. Note that the battery voltage Vbat may also be utilized as a primary side voltage of the BAT converter 34, an auxiliary machinery voltage Vaux, and a step-down converter terminal voltage Vlow.

A battery current Ibat [A] (or a discharge current or a charge current) of the battery 30 is detected by a current sensor 104 and is outputted via a signal line 106 to the BAT ECU 32. A temperature Tbat [° C.] (or a battery temperature) of the battery 30 is detected by a temperature sensor 108 and is outputted via a signal line 110 to the BAT ECU 32.

The BAT ECU 32 controls the battery 30, based on an input value such as a command value from the management ECU 50. The BAT ECU 32 calculates remaining capacitance [%] of the battery 30 (hereinafter called an "SOC" or a "battery SOC"), based on the battery voltage Vbat and the battery current Ibat, and uses the SOC to manage the battery 30.

For example, the BAT ECU 32 calculates an upper limit power value Pbatuplim [kW] (or a battery upper limit power value) of the battery 30 as an upper limit value of discharge power, and a battery lower limit power value Pbatlwlim [kW] as a limit value of charge power, based on the battery temperature Tbat and the SOC.

Note that if the battery power Pbat exceeds the battery upper limit power value Pbatuplim, the battery 30 may enter an over discharge state and thus deteriorate, or if the battery power Pbat becomes lower than the battery lower limit power value Pbatlwlim, the battery 30 may enter an overcharge state and thus deteriorate.

The BAT ECU 32 controls the step-down converter 42, based on an input value such as a command value from the MG ECU 50. An input terminal current [A] (hereinafter called a "step-down converter terminal current Ilow") of the step-down converter 42 is detected by a current sensor 124 and is outputted via a signal line 126 to the BAT ECU 32. The BAT ECU 32 multiplies the step-down converter terminal voltage Vlow [kV] and the step-down converter terminal current Ilow [A] together to calculate step-down converter terminal power Plow [kW] (hereinafter, also called "step-down converter power consumption Plow" or "power consumption Plow").

The BAT ECU 32 transmits the battery voltage Vbat, the battery current Ibat, the battery temperature Tbat, the battery SOC, the battery upper limit power value Pbatuplim, the battery lower limit power value Pbatlwlim or the like to the MG ECU 50, the FC converter ECU 26 or the like via the communication network 70.

The MG ECU 50, the MOT ECU 16, the FC ECU 22, the FC converter ECU 26, the BAT ECU 32, and the BAT converter ECU 36 share data or the like via the communication network 70.

As mentioned above, the BAT converter 34 steps up an output voltage of the battery 30 (or the battery voltage Vbat) and supplies the voltage to the inverter 14. In addition, the BAT converter 34 steps down a regenerative voltage of the motor 12 (hereinafter called a "regenerative voltage Vreg") or the secondary side voltage of the FC converter 24 (or the inverter terminal voltage Vinv) and supplies the voltage to the battery 30.

The BAT converter 34 is disposed between the battery 30 and the inverter 14. In other words, the BAT converter 34 is connected at one side to the primary side on which the battery 30 is located, and the BAT converter 34 is connected at the other side to the secondary side as a point of connection between the FC 20 side and the inverter 14.

The primary side voltage of the BAT converter 34 is detected by the voltage sensor 100. A primary side current Ibatcon1 of the BAT converter 34 is detected by a current sensor 134 and is outputted via a signal line 136 to the BAT converter ECU 36. The secondary side voltage of the BAT converter 34 is detected by the voltage sensor 60. A secondary side current Ibatcon2 of the BAT converter 34 is detected by a current sensor 138 and is outputted via a signal line 140 to the BAT converter ECU 36.

Note that the primary side current Ibatcon1 is a current closer to the BAT converter 34 than a connection point 144 for the auxiliary machinery in a power line 142 connecting the battery 30 and the BAT converter 34, and during discharge of the battery 30, Ibatcon1 is calculated by subtracting Iaux from Ibat (Ibatcon1=Ibat−Iaux), whereas during charge of the battery 30, Ibatcon1 is calculated by adding Ibat and Iaux together (Ibatcon1=Ibat+Iaux).

The BAT converter ECU 36 controls the BAT converter 34, based on an input value such as a command value from the management ECU 50. Hereinafter, the BAT converter 34 and the BAT converter ECU 36 will also be called a "BAT VCU 150", which means a voltage control unit for the battery 30.

The BAT converter ECU 36 transmits the primary side current Ibatcon1 and the secondary side current Ibatcon2 to the MG ECU 50 and the FC converter ECU 26 and the like via the communication network 70. The BAT converter ECU 36 manages, as a passing current Ibatt, an output one of the primary side current Ibatcon1 and the secondary side current Ibatcon2, which is outputted by the BAT converter 34. For example, when the battery 30 is being charged, the primary side current Ibatcon1 is set as the passing current Ibatt.

As described above, the air pump 28, the air conditioner 40, the step-down converter 42 and the 12V system 44 are included in the auxiliary machinery system 4000. A water pump (not illustrated) included in the cooling system of the FC system 2000 and configured to circulate water as a refrigerant for cooling the FC 20 is also additionally included in the auxiliary machinery system 4000.

The air conditioner 40 adjusts a room temperature or the like in the vehicle 10. Electric power Pac [kW] consumed by the air conditioner 40 is transmitted from a control device (not illustrated) of the air conditioner 40 to the MG ECU 50, the FC converter ECU 26 or the like via the communication network 70.

The step-down converter 42 steps down the battery voltage Vbat as the primary side voltage of the BAT converter 34 (or the BAT VCU 150) and supplies the voltage to the 12V system 44. Besides including the various ECUs such as the MG ECU 50 as mentioned above, the 12V system 44 includes a 12V battery, accessories, a radiator fan, a headlight, and the like, which are not illustrated. The accessories include equipment such as audio equipment and a navigation device. The radiator fan is a fan configured to cause a radiator to cool the refrigerant circulated by the above-mentioned water pump.

The MG ECU 50 transmits the command values to the MOT ECU 16, the FC ECU 22, the FC converter ECU 26, the BAT ECU 32, the BAT converter ECU 36 and the like via the communication network 70. Thereby, the MG ECU 50 controls the motor 12, the inverter 14, the FC 20, the FC converter 24, the battery 30, the BAT converter 34, and the auxiliary machinery. When performing such control, the MG ECU 50 executes a program stored in a storage unit (not illustrated). Moreover, the MG ECU 50 uses detected values of various sensors such as the voltage sensors 60, 80, 100 and the current sensors 64, 84, 92, 104, 124, 134, 138.

In addition to the above-mentioned sensors, the various sensors as employed herein include a sensor (hereinafter called an "amount-of-AP-operation sensor" or an "AP opening sensor") for detecting the amount of operation gap [%] (or an opening) of an accelerator pedal (not illustrated), and a number-of-motor-revolutions sensor and a wheel speed sensor (which are not illustrated). The number-of-motor-revolutions sensor detects the number of revolutions [rpm] of the motor 12 (hereinafter called "the number Nmot of revolutions of the motor" or "the number Nmot of revolutions"). The MG ECU 50 uses the number Nmot of revolutions to detect a vehicle speed Vs [km/h] of the FC vehicle 10. The wheel speed sensor detects speeds (or wheel speeds) of the wheels (not illustrated).

The MG ECU 50 calculates the requested system power Psysreq [kW] as a system load (or a whole load) requested for the entire FC vehicle 10, based on inputs (or load requests) from various switches and the various sensors, besides the state of the FC 20, the state of the battery 30, and the state of the motor 12.

Then, the MG ECU 50 arbitrates and determines distribution of requested FC power Pfcreq as a load (or an FC load) to be borne by the FC 20, requested battery power Pbatreq as a load (or a battery load) to be borne by the battery 30, and the regenerative power Preg as a load (or a regenerative load) to be borne by a regenerative power supply (or the motor 12), based on the requested system power Psysreq.

Then, the MG ECU 50 further transmits the command values to the MOT ECU 16, the FC ECU 22, the FC converter ECU 26, the BAT ECU 32, the BAT converter ECU 36 and the like, according to the above-mentioned loads.

[Description of Control Method and Operation]

Next, description will be given with regard to a method for controlling the fuel cell vehicle 10 according to the embodiment basically configured as described above, and operation thereof, in the following order.

1) General control (control in battery protection priority)
 [1] Conclusion of general control (control in battery protection priority) (including comparative example)]
2) Exceptional control (control in battery protection priority+control in FC protection temporary priority)
 2-1) Necessity for FC protection (FC high power protection, FC high voltage protection) associated with exceptional control
 2-2) Exceptional control (control in battery protection priority+FC high voltage protection)
  2-2-1) Control during FC VCU non-direct connection/FC high voltage protection
  2-2-2) Control during FC VCU direct connection/FC high voltage protection
 2-3) Exceptional control (control in battery protection priority+control in FC high power protection)
  2-3-1) Differential power (FC high power protection) control
  2-3-2) Single power (FC high power protection) control
 [2] Conclusion of exceptional control (control in battery protection priority+control in FC protection temporary priority)]
1) Description of General Control (Control in Battery Protection Priority)

This general control involves preventing deterioration due to overcharge and over discharge of the battery 30, thereby protecting the battery 30.

Figure 2A:
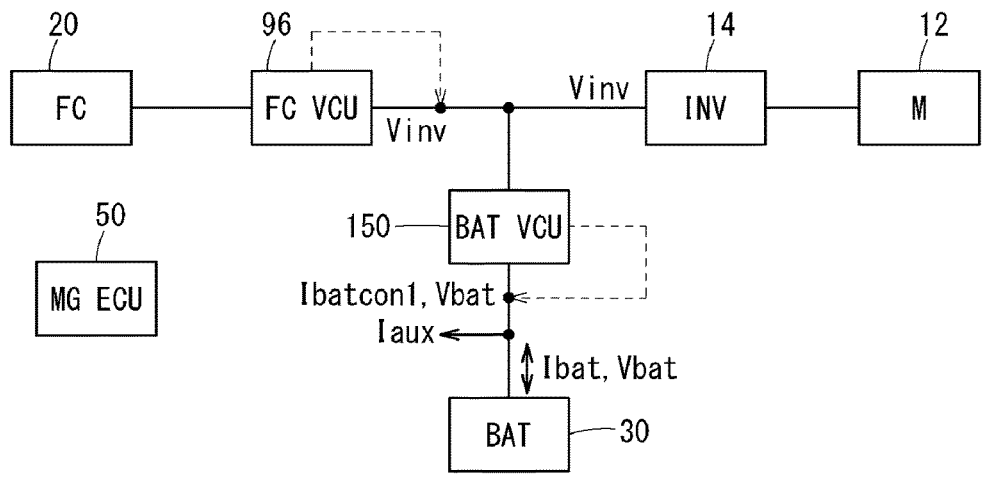
FIG. 2A is a circuit diagram of assistance in explaining general control (control in battery protection priority).

As illustrated in a circuit diagram of assistance in explaining general control of FIG. 2A, during the general control (the control in the battery protection priority), the MG ECU 50 controls the primary side current Ibatcon1 and the battery voltage Vbat of the BAT converter 34 by the BAT ECU 32 of the BAT VCU 150 thereby to control (or limit) the battery current Ibat and the battery voltage Vbat of the battery 30. (Refer to the arrowed broken line extending from a block of the BAT VCU 150 toward a primary side line (or a power line) of the BAT VCU 150 in FIG. 2A.)

As mentioned above, during the discharge of the battery 30, the primary side current Ibatcon1 of the BAT converter 34 can be calculated by Ibatcon1=Ibat−Iaux, and during the charge of the battery 30, the primary side current Ibatcon1 can be calculated by Ibatcon1=Ibat+Iaux.

Moreover, in the general control, at the same time, the MG ECU 50 controls the inverter terminal voltage Vinv as the secondary side voltage of the FC converter 24 by the FC converter ECU 26 of the FC VCU 96 in order to ensure the requested inverter terminal power Pinvreq as electric power required for the motor load of the drive system 1000. (Refer to the arrowed broken line extending from a block of the FC VCU 96 toward a secondary side line (or a power line) of the FC VCU 96 in FIG. 2A.)

Next, the general control (the control in the battery protection priority) will be described in more detail with reference to a flowchart of FIG. 3 and a time chart of FIG. 4.

In all flowcharts described below, a subject which executes programs associated with the flowcharts is the MG ECU 50; however, description will be given with appropriate omissions for convenience of understanding and for avoidance of complexity. Moreover, the same processing contents are indicated by the same step number, and detailed description of the same processing will be omitted.

At step S1, the MG ECU 50 detects the amount of operation θap of the accelerator pedal from the amount-of-AP-operation sensor, and calculates requested drive power Dreq [Nm] (torque (power) of the motor 12) of the motor load (the drive system 1000), based on the amount of operation θap.

At step S2, the MG ECU 50 calculates the requested inverter terminal power Pinvreq corresponding to the requested drive power Dreq [Nm] of the drive system 1000, and further calculates the requested auxiliary machinery power Pauxreq of the auxiliary machinery system 4000 and calculates the requested system power Psysreq as Psysreq=Pinvreq+Pauxreq.

Figure 4:
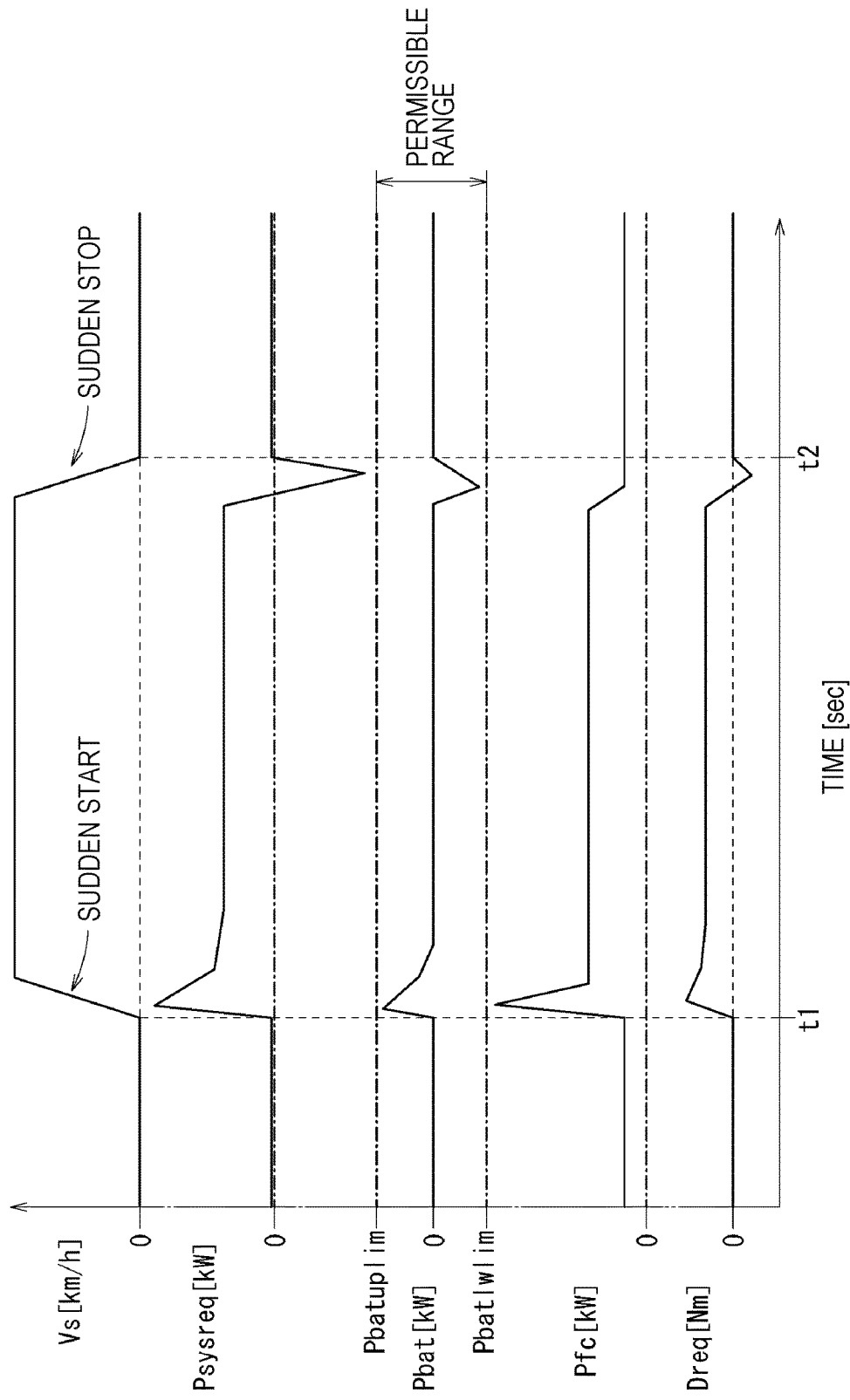
FIG. 4 is a time chart of assistance in explaining the operation of the general control (the control in battery protection priority).

The time chart of FIG. 4 illustrates a driving state (which is also an idling state) in which at time t1, the FC vehicle 10 suddenly starts from the idling state (including an idling stop state: the same goes for the following description) and then reaches a constant speed traveling state, and further, immediately before time t2, the FC vehicle 10 suddenly brakes from constant speed traveling state, and after the time t2, the FC vehicle 10 suddenly stops.

In the time chart of FIG. 4, before the time t1 and after the time t2, power consumption by the auxiliary machinery system 4000 is relatively low, and the requested system power Psysreq is substantially 0 [kW]. Moreover, the requested system power Psysreq sharply increases corresponding to an acceleration operation at the time t1 and then becomes constant power in the constant speed traveling state such as a cruising state on a flat road, and immediately before the time t2, the requested system power Psys sharply increases in a negative value by the regenerative power of the motor 12, corresponding to a deceleration operation of the brake.

At step S3 under such a driving condition, the MG ECU 50 calculates battery power as a target (target battery power) Pbattar, based on the requested system power Psysreq and the SOC of the battery 30.

At step S4, the MG ECU 50 determines whether or not the target battery power Pbattar calculated at step S3 is lower than the battery upper limit power value Pbatuplim which proceeds deterioration if it becomes higher discharge power at the time of acceleration immediately after the time t1 (Pbattar<Pbatuplim). Meanwhile, the MG ECU 50 determines whether or not the target battery power Pbattar is higher than the battery lower limit power value Pbatlwlim (see FIG. 4) which proceeds deterioration if it becomes lower charge power at the time of deceleration immediately before the time t2 (Pbattar>Pbatlwlim).

If a determination at step S4 is affirmative (step S4: YES), in order words, if the target battery power Pbattar is higher than the battery lower limit power value Pbatlwlim and is lower than the battery upper limit power value Pbatuplim, the target battery power Pbattar is within an allowable range (see FIG. 4), so that the battery 30 can be protected.

Then, in this case, at step S5, target FC power Pfctar (Pfctar=Psysreq−Pbattar) is calculated by subtracting the target battery power Pbattar calculated at step S3 from the requested system power Psysreq calculated at step S2.

Then, at step S6, in an aspect of the general control described with reference to FIG. 2A, the MG ECU 50 controls the FC VCU 96 so that the inverter terminal voltage Vinv as the secondary side voltage of the FC VCU 96 (the FC converter 24) reaches the inverter terminal voltage Vinv corresponding to the requested inverter terminal power Pinvreq calculated at step S2, while the MG ECU 50 performs direct control by the BAT converter ECU 36 so that the primary side current Ibatcon1 and the battery voltage Vbat as the primary side voltage of the BAT VCU 150 (the BAT converter 34) reach the target battery power Pbattar

[kW] (during discharge: Pbattar=Ibatcon1×Vbat+Pauxreq; during charge: Pbattar=Ibatcon1×Vbat−Pauxreq) calculated at step S3.

On the other hand, if a determination at step S4 is negative (step S4: NO), in other words, if the target battery power Pbattar is equal to or higher than the battery upper limit power value Pbatuplim (Pbattar≥Pbatuplim), or if the target battery power Pbattar is equal to lower than the battery lower limit power value Pbatlwlim (Pbattar≤Pbatlwlim), the target battery power Pbattar is outside the allowable range, so that the battery 30 cannot be protected.

In this case, at step S7, the value of the target battery power Pbattar is updated (or recalculated) inclusive of an allowance (or a margin) so that the target battery power Pbattar becomes power between the battery upper limit power value Pbatuplim and the battery lower limit power value Pbatlwlim.

Then, after the updating of the target battery power Pbattar at step S7, at step S5, the target FC power Pfctar is calculated by subtracting the target battery power Pbattar calculated (or updated) at step S7 from the requested system power Psysreq calculated at step S2.

Then, at step S6, as mentioned above, in the aspect of the general control described with reference to FIG. 2A, the MG ECU 50 controls the FC VCU 96 so that the inverter terminal voltage Vinv as the secondary side voltage of the FC VCU 96 (the FC converter 24) reaches the inverter terminal voltage Vinv corresponding to the requested inverter terminal power Pinvreq calculated at step S2, while the MG ECU 50 performs direct control by the BAT converter ECU 36 so that the primary side current Ibatcon1 and the battery voltage Vbat as the primary side voltage of the BAT VCU 150 (the BAT converter 34) reach the target battery power Pbattar [kW] calculated (or updated) at step S7 (during discharge: Pbattar=Ibatcon1×Vbat+Pauxreq; during charge: Pbattar=Ibatcon1×Vbat−Pauxreq).

[1] Conclusion of General Control (Control in Battery Protection Priority) (Including Comparative Example)]

In the method for controlling the FC vehicle 10 according to this general control, first, the MG ECU 50 performs a battery target power calculation step (steps S1 to S3) of calculating the target battery power Pbattar based on the requested system power Psysreq of the entire FC vehicle 10 including the requested inverter terminal power Pinvreq (requested motor drive unit terminal power) as the requested power of the inverter 14, and the SOC of the battery 30.

Then, the MG ECU 50 performs a battery power control step (step S6) of causing the BAT converter 34 to control the power of the battery 30 via the BAT converter ECU 36, based on the target battery power (a power accumulation device target power) Pbattar calculated at the battery target power calculation step.

Then, the MG ECU 50 performs an FC target power calculation step (step S5) of calculating power obtained by subtracting the target battery power Pbattar from the requested system power Psysreq as the target FC power (a fuel cell target power) Pfctar (Pfctar←Psysreq−Pbattar).

Finally, the MG ECU 50 performs an FC power control step (step S6) of causing the FC converter 24 to set the inverter terminal voltage Vinv satisfying the requested inverter terminal power Pinvreq via the FC ECU 22 (see a connection state of FIG. 2A), and controlling the actual FC power Pfc (the power of the FC 20) via the FC ECU 22 so that the actual battery power Pbat and the actual FC power Pfc satisfy the requested system power Psysreq of the entire FC vehicle 10.

According to the method for controlling the FC vehicle 10 according to the embodiment, the battery power Pbat is controlled by priority (or is directly controlled (see FIG. 2A)) by the BAT converter 34 of the BAT VCU 150, based on the target battery power Ibattar taking into account the SOC of the battery 30, and the fuel cell power Pfc is controlled (or is indirectly controlled) so that the battery power Pbat and the FC power Pfc satisfy the requested system power Psysreq of the entire FC vehicle 10, which thus can prevent the overcharge and over discharge of the battery 30 by priority, while satisfying the requested system power Psysreq of the entire FC vehicle 10.

Moreover, the FC vehicle 10 according to the embodiment includes the FC 20, the battery 30, the inverter 14 as the motor drive unit to drive the motor 12 for generating traveling power, the BAT converter 34 as a first converter connected between the battery 30 and the inverter 14 and configured to convert the voltage, and the FC converter 24 as a second converter connected between the FC 20 and the inverter 14 and configured to convert the voltage.

The FC vehicle 10 further includes a power accumulation device target power calculator as a functional unit of the MG ECU 50, and the power accumulation device target power calculator calculates the target battery power Pbattar based on requested motor drive unit terminal power (the requested inverter terminal power Pinvreq corresponding to the requested drive power Dreq [Nm] of the drive system 1000) as requested power of the inverter 14, the requested system power Psysreq of the entire FC vehicle 10 including the requested auxiliary machinery power Pauxreq of the auxiliary machinery system 4000, and the SOC of the battery 30.

The FC vehicle 10 further includes a power accumulation device power controller as a functional unit of the MG ECU 50, the BAT converter ECU 36 and the BAT ECU 32, and the power accumulation device power controller causes the BAT converter 34 to control the actual battery power Pbat, based on the target battery power Pbattar. Here, the power accumulation device power controller is formed of a feedback circuit or the like, for example.

The FC vehicle 10 further includes a fuel cell power controller as a functional unit of the MG ECU 50 and the FC converter ECU 26, and the fuel cell power controller controls the fuel cell power Pfc so that the battery power Pbat and the FC power Pfc satisfy the requested system power of the entire FC vehicle 10.

Thus, according to the FC vehicle 10 according to the embodiment, which the general control (the control in the battery protection priority is applied to, the power accumulation device target power calculator calculates the target battery power Pbattar of the battery 30 taking into account the SOC of the battery 30. The power accumulation device target power controller controls (or directly controls) the power of the battery 30 by priority, based on the calculated target battery power Pbattar, and the FC ECU 22 controls the FC power Pfc so that the battery power Pbat and the FC power Pfc satisfy the requested system power Psysreq, which thus can prevent the overcharge and over discharge of the battery 30 and can protect the battery 30, while satisfying the requested system power Psysreq of the entire FC vehicle 10.

Furthermore, according to the FC vehicle 10 according to the embodiment, which the general control (the control in the battery protection priority is applied to, the BAT converter 34 of the BAT VCU 150 controls the battery voltage Vbat as the primary side voltage of the BAT converter 34, and the FC converter 24 of the FC VCU 96 controls the inverter terminal voltage Vinv as the secondary side voltage of the FC converter 24, which thus can ensure drivability of the FC vehicle 10, while protecting the battery 30.

Figure 3:
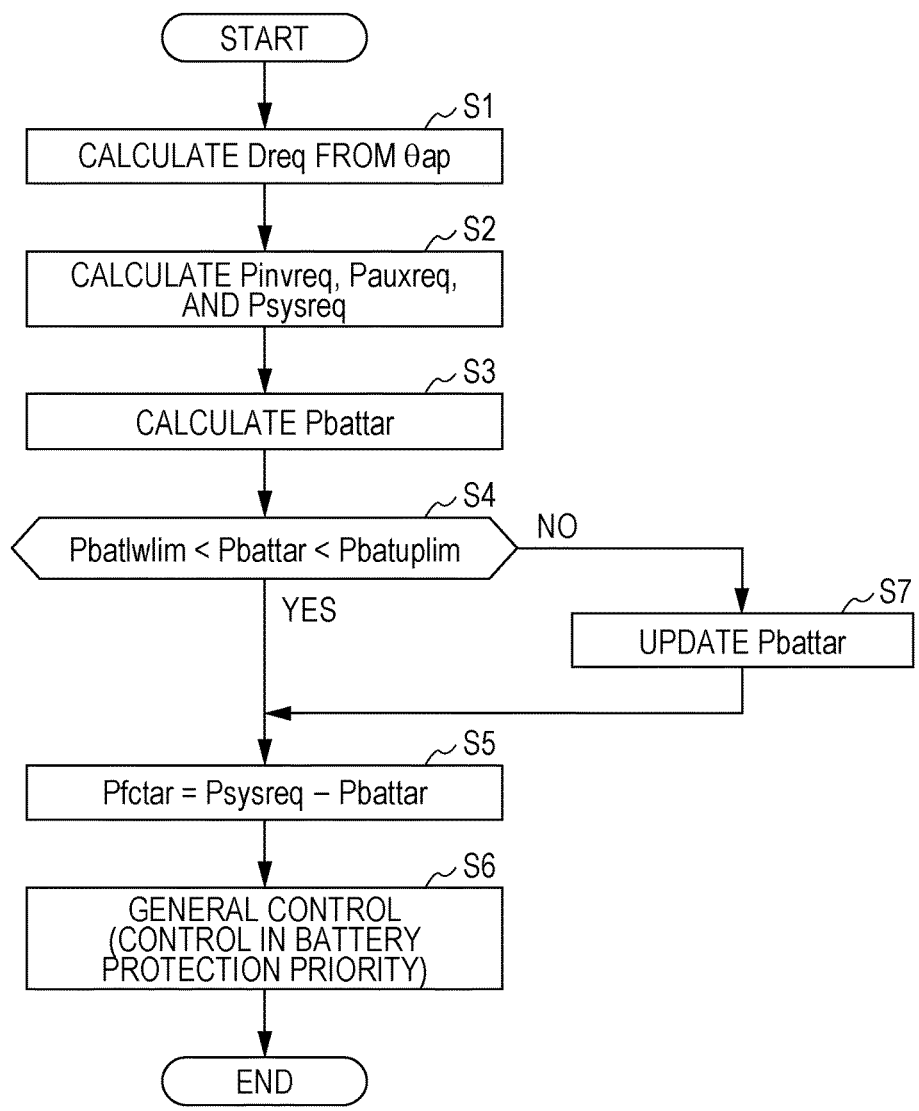
FIG. 3 is a flowchart of assistance in explaining operation of the general control (the control in battery protection priority).
Figure 5:
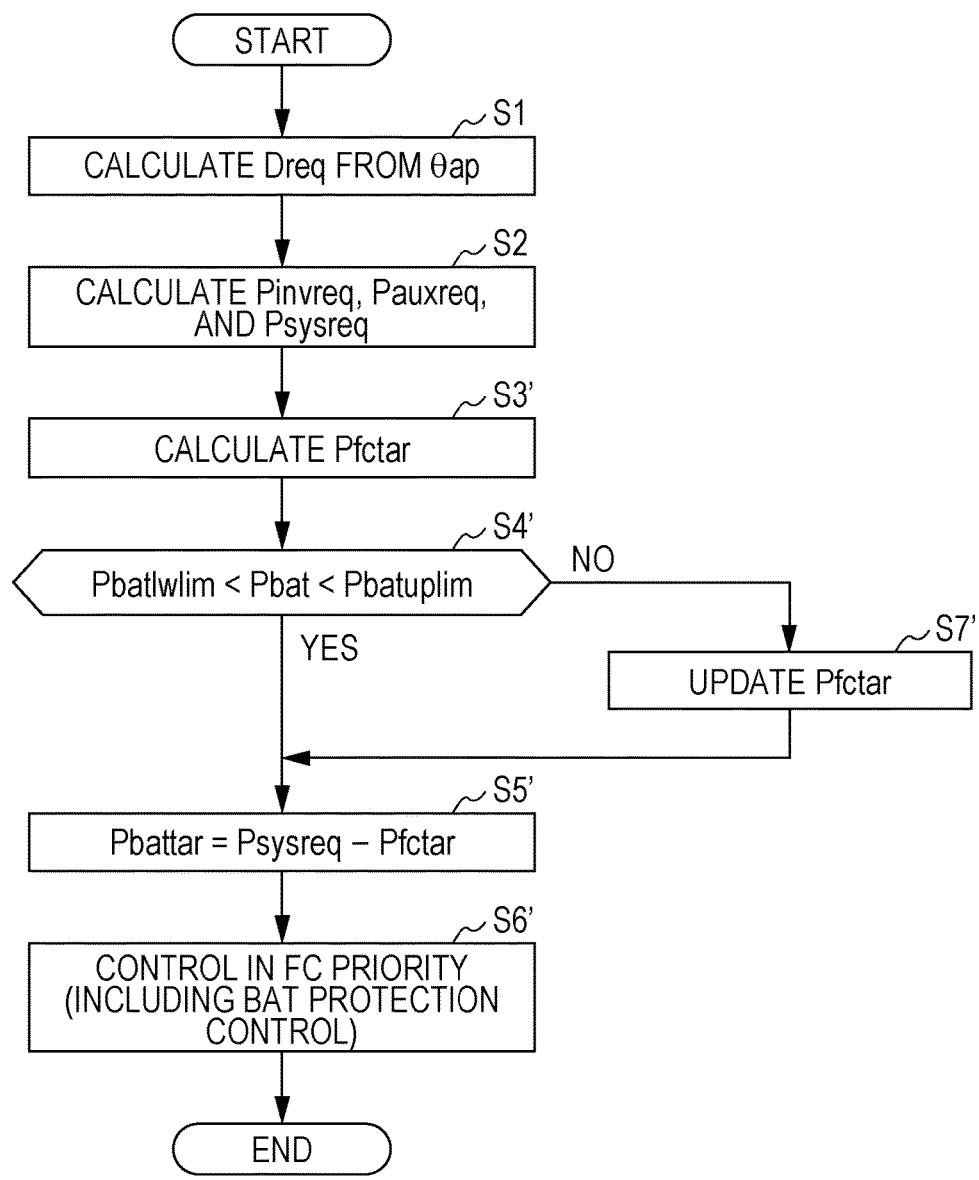
FIG. 5 is a flowchart of a comparative example.

FIG. 5 is a flowchart applied to an FC vehicle of a comparative example, steps having the same processing contents are indicated by the same step numbers and steps having different processing objects are indicated by the same step numbers having "'" added thereto, as compared to the flowchart of FIG. 3 of the general control of the FC vehicle 10 according to the embodiment.

In other words, in the FC vehicle of the comparative example, at step S3', the target FC power Pfctar is calculated by priority (or by preference) over the target battery power Pbattar.

Then, at step S4', the MG ECU 50 makes a determination to protect the battery 30 by the actual power Pbat, and when a determination is made that protection is necessary (step S4': NO), at step S7', the target FC power Pfctar is updated by preference over the target battery power Pbattar.

Then, at step S5', the target battery power Pbattar is calculated by subtracting the target FC power Pfctar from the requested system power Psysreq.

Then, at step S6', battery protection control under control in FC priority according to the comparative example is performed.

Figure 6A:
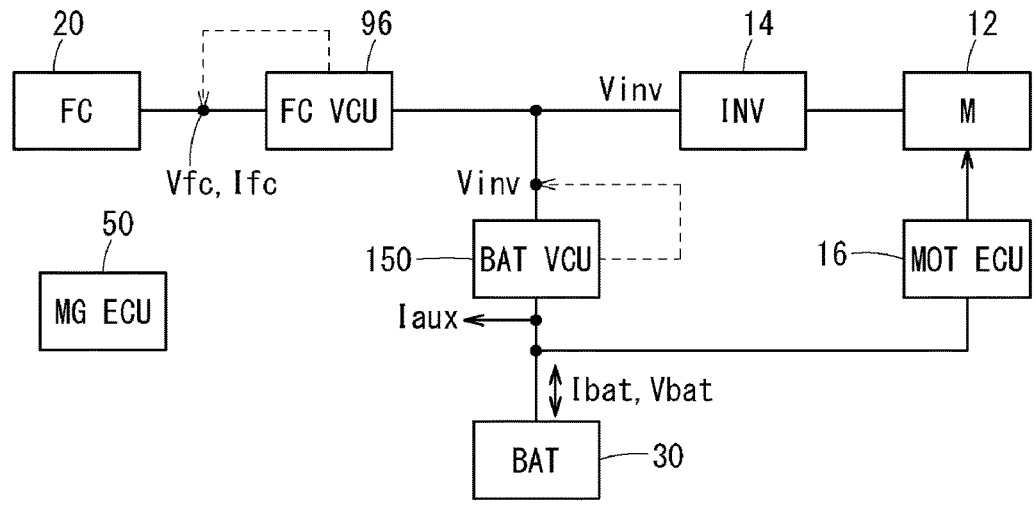
FIG. 6A is a circuit diagram of assistance in explaining battery over-discharge protection of the comparative example.

FIG. 6A is a diagram of assistance in explaining battery protection during discharge under the control in FC priority according to the comparative example.

In the comparative example, the MOT ECU 16 estimates the battery power Pbat from the battery voltage Vbat and the battery current Ibat, and the torque of the motor 12 is limited (or is reduced) via the MOT ECU 16 so that the estimated battery power Pbat does not exceed the battery upper limit power value Pbatuplim which leads to over discharge.

Figure 6B:
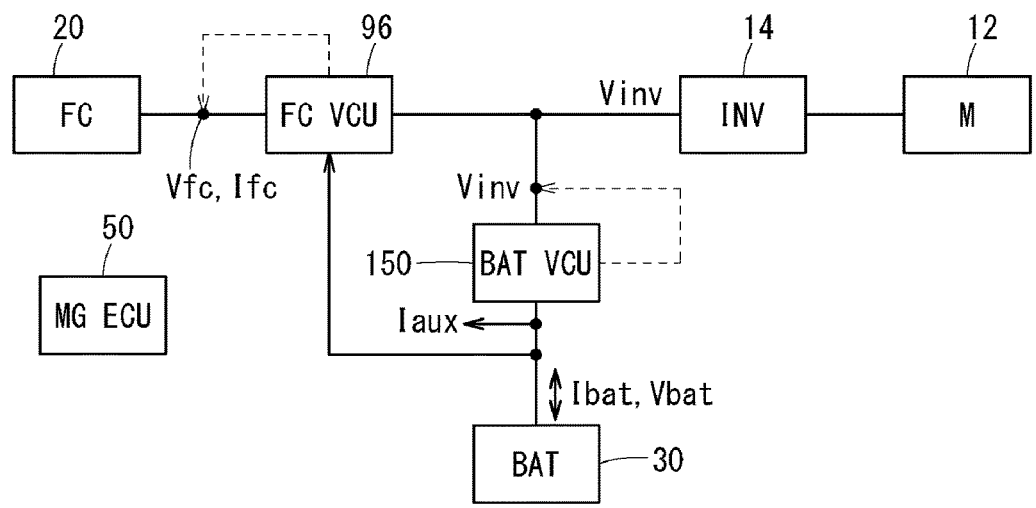
FIG. 6B is a circuit diagram of assistance in explaining battery overcharge protection of the comparative example.

FIG. 6B is a diagram of assistance in explaining battery protection during charge under the control in FC priority according to the comparative example.

In the comparative example, the FC VCU 96 estimates the battery power Pbat from the battery voltage Vbat and the battery current Ibat, and the FC power Pfc is limited (or the FC current Ifc is reduced) via the FC VCU 96 so that the estimated battery power Pbat is not lower than the battery lower limit power value Pbatlwlim which leads to overcharge.

Figure 7:
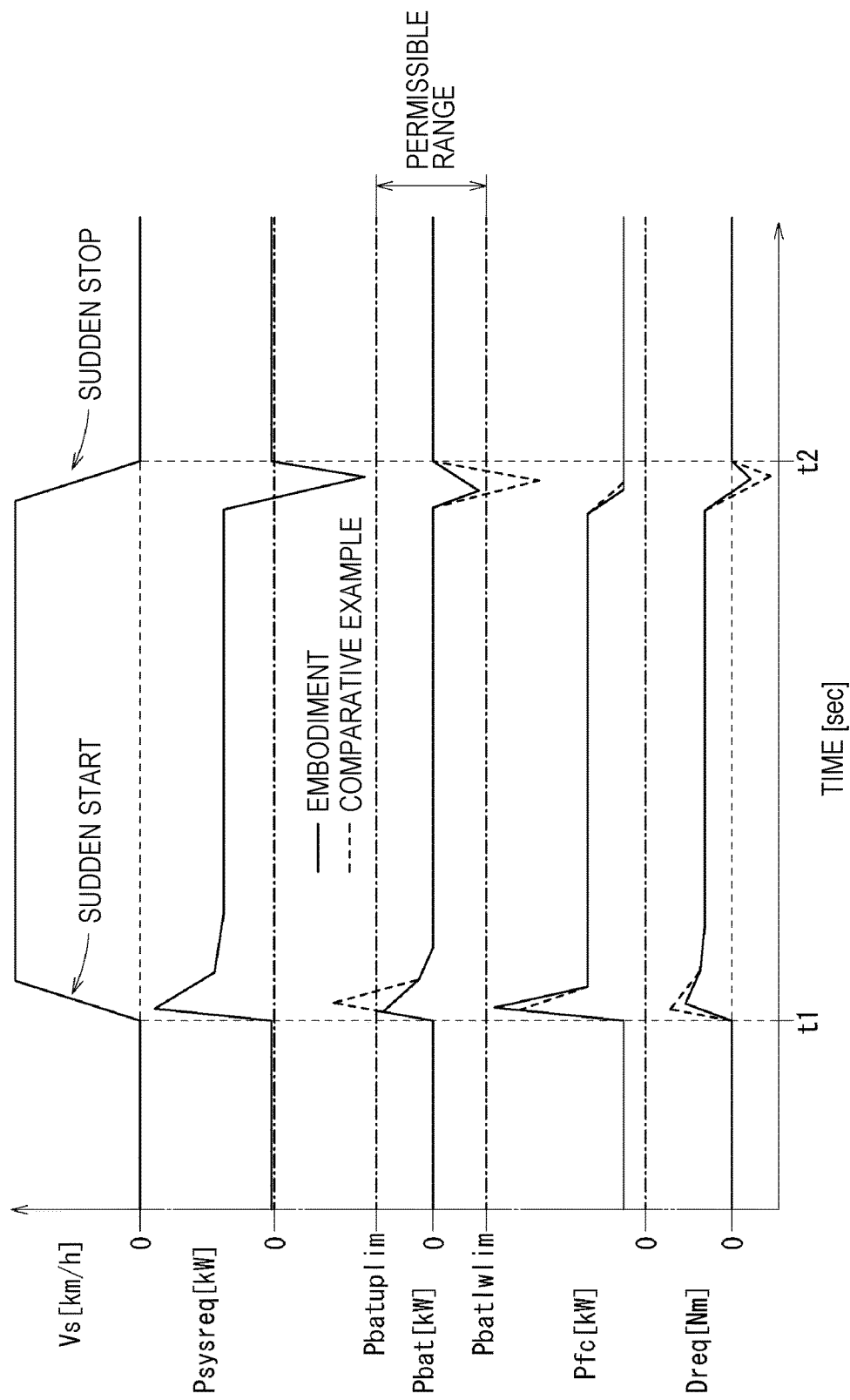
FIG. 7 is a time chart of assistance in explaining comparison between the general control (the control in battery protection priority) according to the embodiment and the comparative example.

A time chart of FIG. 7 illustrates a time chart in which a waveform of the comparative example indicated by a broke line is superimposed on a waveform of the embodiment with reference to FIG. 4.

In the FC vehicle of the comparative example, the FC power Pfc is controlled by priority, and the over discharge protection of the battery 30 is indirectly controlled by the MOT ECU 16 as described with reference to FIG. 6A, and thus, the battery power Pbat may exceed the battery upper limit power value Pbatuplim (see the waveform of the battery power Pbat of the broke line immediately after the time t1 in FIG. 7). Moreover, in the FC vehicle of the comparative example, the FC power Pfc is controlled by priority, and the overcharge protection of the battery 30 is indirectly controlled by the FC VCU 96 as described with reference to FIG. 6B, and thus, the battery power Pbat may be lower than the battery lower limit power value Pbatlwlim (see the waveform of the battery power Pbat of the broke line immediately before the time t2 in FIG. 7).

In the above-mentioned embodiment, control is performed so that the battery power Pbat does not exceed the battery upper limit power value Pbatuplim and so that the battery power Pbat is not lower than the battery lower limit power value Pbatlwlim; however, in place of or in combination with this control, control may be controlled so that a change ($\Delta Pbat/\Delta t$: a differential value) in the battery power Pbat with respect to time does not exceed a change value (a differential value) of the battery upper limit power with respect to time or is not lower than a change value (a differential value) of the battery lower limit power with respect to time.

2) Description of Exceptional Control (Control in Battery Protection Priority+Control in FC Protection Temporary Priority)

Figure 8:
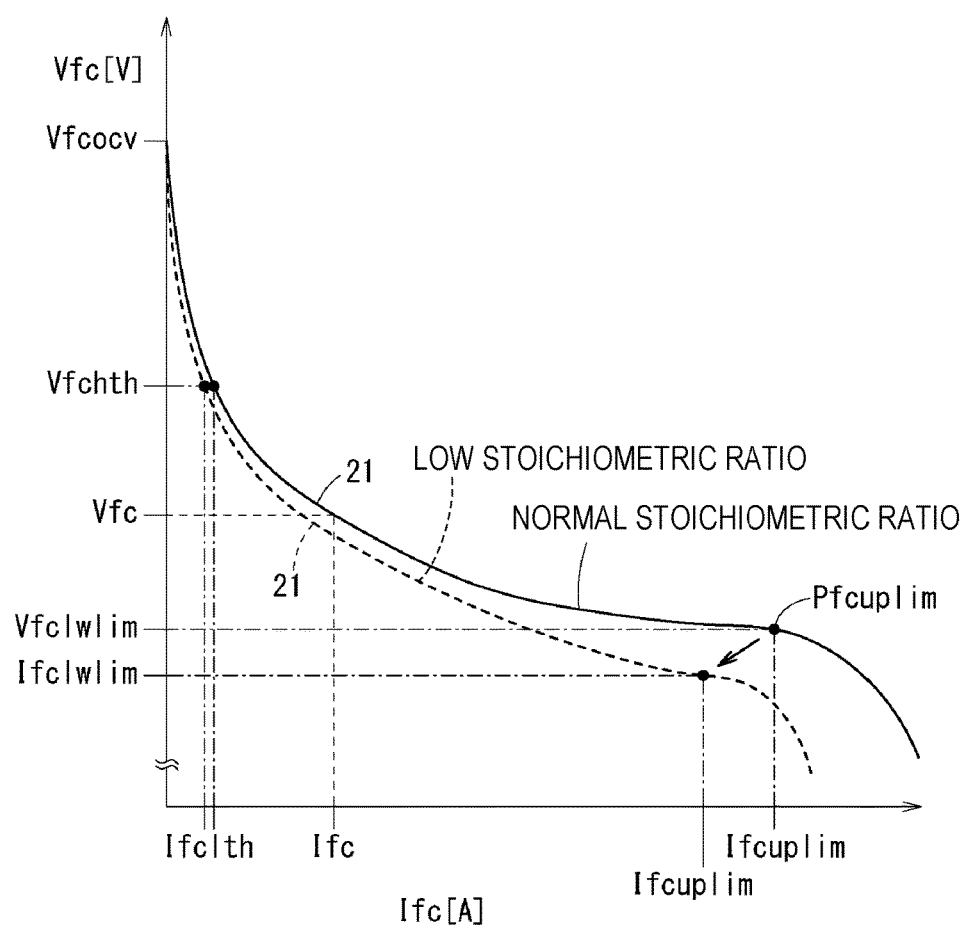
FIG. 8 is a graph of IV characteristics of assistance in explaining the large power/high voltage protection of the fuel cell.

2-1) Description of Necessity for FC Protection (FC High Power Protection, FC High Voltage Protection) Associated with Exceptional Control FIG. 8 illustrates IV (current-voltage) characteristics 21 of the FC 20 for description of necessity for fuel cell protection (FC protection) associated with exceptional control described below.

The IV characteristic 21 indicated by a solid line indicates an IV characteristic (a normal IV characteristic) in a state in which a stoichiometric ratio is normal (oxygen and hydrogen are rich), and the IV characteristic 21 indicated by a broken line indicates, a so-called low stoichiometric characteristic just before stoichiometric shortage, in which the stoichiometric ratio is low in a state close to 1.

As well known, for oxygen, the stoichiometric ratio refers to "an air flow rate supplied to the cathode electrode"/"an air flow rate consumed by power generation" (a cathode stoichiometric ratio), and for hydrogen, the stoichiometric ratio refers to "a hydrogen flow rate supplied to the anode electrode"/"a hydrogen flow rate consumed by power generation" (an anode stoichiometric ratio).

In short, the IV characteristic 21 indicated by the broken line indicates an IV characteristic when one or both of the stoichiometric ratios become small from the rich state to the state close to "1". The IV characteristic 21 continuously changes from the IV characteristic 21 indicated by the solid line to the IV characteristic 21 indicated by the broken line.

The protection of the FC 20 is performed by performing control such that the FC power Pfc does not exceed upper limit power (an FC upper limit power value) Pfcuplim (FIG. 8) of the FC 20, or by performing control such that the FC voltage Vfc does not exceed a high voltage deterioration threshold Vfchth (FIG. 8) which causes high voltage deterioration in the FC 20.

Firstly, description will be given with regard to necessity for the control such that the FC power Pfc does not exceed the FC upper limit power value Pfcuplim.

It is known that when the cathode stoichiometric ratio is low, power efficiency of the FC 20 deteriorates, whereas when the anode stoichiometric ratio is low, the FC 20 deteriorates.

Thus, in the FC vehicle 10 according to the embodiment, in order to prevent deterioration or the like in the FC 20 (or in order to protect the FC 20), the current IV characteristic is always detected (or calculated) and is compared to the normal IV characteristic 21 indicated by the solid line to detect whether or not the characteristic is (or is close to) the IV characteristic 21 indicated by the broken line just before irreversible deterioration. If the characteristic is (or is close to) the IV characteristic 21 indicated by the broken line, the FC upper limit power value Pfcuplim (or a normal value) of the FC 20 is changed to upper limit FC power Pfcuplim corresponding to the IV characteristic 21 indicated by the broken line, and control is performed so that a decrease and a deterioration in the efficiency do not occur.

Next, description will be given with regard to necessity for the control such that the FC voltage Vfc does not exceed the high voltage deterioration threshold Vfchth.

As can be seen from the IV characteristic 21, the FC 20 has the well-known characteristic that the FC current Ifc increases as the FC voltage Vfc becomes lower than an FC open circuit voltage Vfcocv.

In the IV characteristic 21, the FC high voltage deterioration threshold Vfchth is a voltage value at which oxidation reduction reaction for platinum as a catalyst becomes active and the deterioration in the FC 20 tends to proceed, and thus, it is necessary to use (or control) the FC 20 so that the FC voltage Vfc is equal to or less than the FC high voltage deterioration threshold Vfchth. For the same reason, it is necessary to use (or control) the FC 20 so that the FC current Ifc is equal to or more than an FC low current threshold Ifclth.

Thus, in the FC vehicle 10 according to the embodiment, while the general control (the control in the battery protection priority is performed, the driving state of the FC vehicle 10, for example, the state of the FC 20 is grasped from the IV characteristic 21 or the like, and if a determination is made that the FC 20 is to be protected, it is necessary to perform exceptional control for protecting the FC 20, while continuing the general control (the general control+the exceptional control).

In the embodiment, whether or not to protect the FC 20 associated with the exceptional control is determined according to whether or not the requested FC power Pfcreq may exceed the upper limit FC power Pfcuplim, or according to whether or not a requested FC voltage Vfcreq may exceed an FC high voltage threshold Vfcth.

2-2) Description of Exceptional Control (Control in Battery Protection Priority+FC High Voltage Protection)

2-2-1) Description of Control During FC VCU Non-Direct Connection/FC High Voltage Protection Next, description will be given with reference to a flowchart of FIG. 9 with regard to the control during the non-direct connection of the FC VCU 96 (the FC converter 24)/the FC high voltage protection.

The MG ECU 50 performs the above-mentioned general control (the control in the battery protection priority) at steps S1 to S7.

Then, at step S11, the MG ECU 50 determines whether or not a saving driving mode switch (not illustrated) for saving energy of the FC vehicle 10 or a so-called energy saving mode switch is ON.

In a case of a normal driving mode in which the energy saving mode switch is OFF (step S11: NO), at step S12, a determination is made as to whether or not the FC voltage Vfc of the FC 20 is higher than a voltage threshold Vfcth−Δα (which is also called the FC high voltage threshold), which is the FC high voltage threshold Vfchth allowing for an allowance (or margin) voltage Δα, (Vfchth>Vfc>Vfchth−Δα).

If the FC voltage Vfc is lower than the FC high voltage threshold Vfcth−Δα, it is not necessary to take into account the high voltage deterioration in the FC 20, and thus, the processing is ended. In this case, the general control for preventing the over discharge and overcharge of the battery 30 and protecting the battery 30 (step S7: FIG. 2A) is continued.

Meanwhile, at step S12 in a non-saving driving mode after NO at step S11, if a determination is made that the FC voltage Vfc is higher than the FC high voltage threshold Vfcth−Δα {Vfcth>Vfc>(Vfchth−Δα), step S12: YES}, it is necessary to prevent the high voltage deterioration in the FC 20 and protect the FC 20.

In this case, at step S13, in order to increase the FC current Ifc flowing out of the FC 20, the target battery power Pbattar of the battery 30 is updated and reduced so that the actual battery current Ibat is reduced. In accordance with this, at step S14, the target FC power Pfctar of the FC 20 is updated to increase correspondingly, so that the actual FC power Vfc increases.

In the IV characteristic 21 (see FIG. 8), the FC power Pfc increases according to a decrease (or a reduction) in the FC voltage Vfc, in a region where the FC power Vfc is between the low FC power Pfc=Vfchth×Ifclth, corresponding to a high voltage deterioration point, and the upper limit FC power Pfcuplim. Thus, in this region, the actual FC power Vfc is controlled to increase, so that the FC voltage Vfc can be reduced. As a result, the high voltage deterioration in the FC 20 can be prevented.

In order to perform prevention of the high voltage deterioration, at step S15, exceptional control during non-direct connection is performed.

Figure 2B:
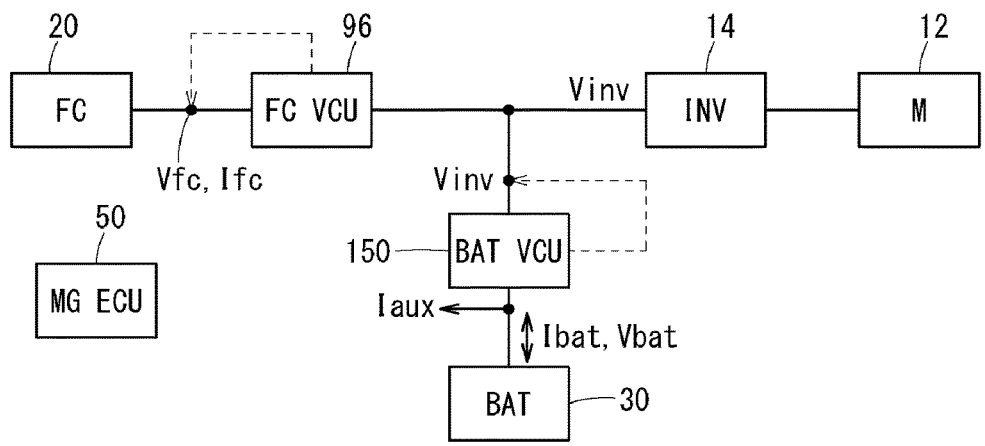
FIG. 2B is a circuit diagram of assistance in explaining exceptional control during non-direct connection (control in fuel cell large power/high voltage protection).

In the exceptional control during the non-direct connection, as illustrated in a circuit diagram of FIG. 2B of assistance in explaining the exceptional control during the non-direct connection, while the BAT VCU 150 performs control without changing the inverter terminal voltage Vinv, the FC VCU 96 increases a step-up ratio of the FC converter 24 to reduce the FC voltage Vfc of the FC 20 and increase the FC current Ifc. The high voltage deterioration in the FC 20 can be prevented by reducing the FC voltage Vfc. In this case, corresponding to an increase in the FC current Ifc, the passing current Ibatt of the BAT VCU 150 from the primary side to the secondary side decreases, and the battery current Ibat outputted from the BAT 30 decreases.

Figure 9:
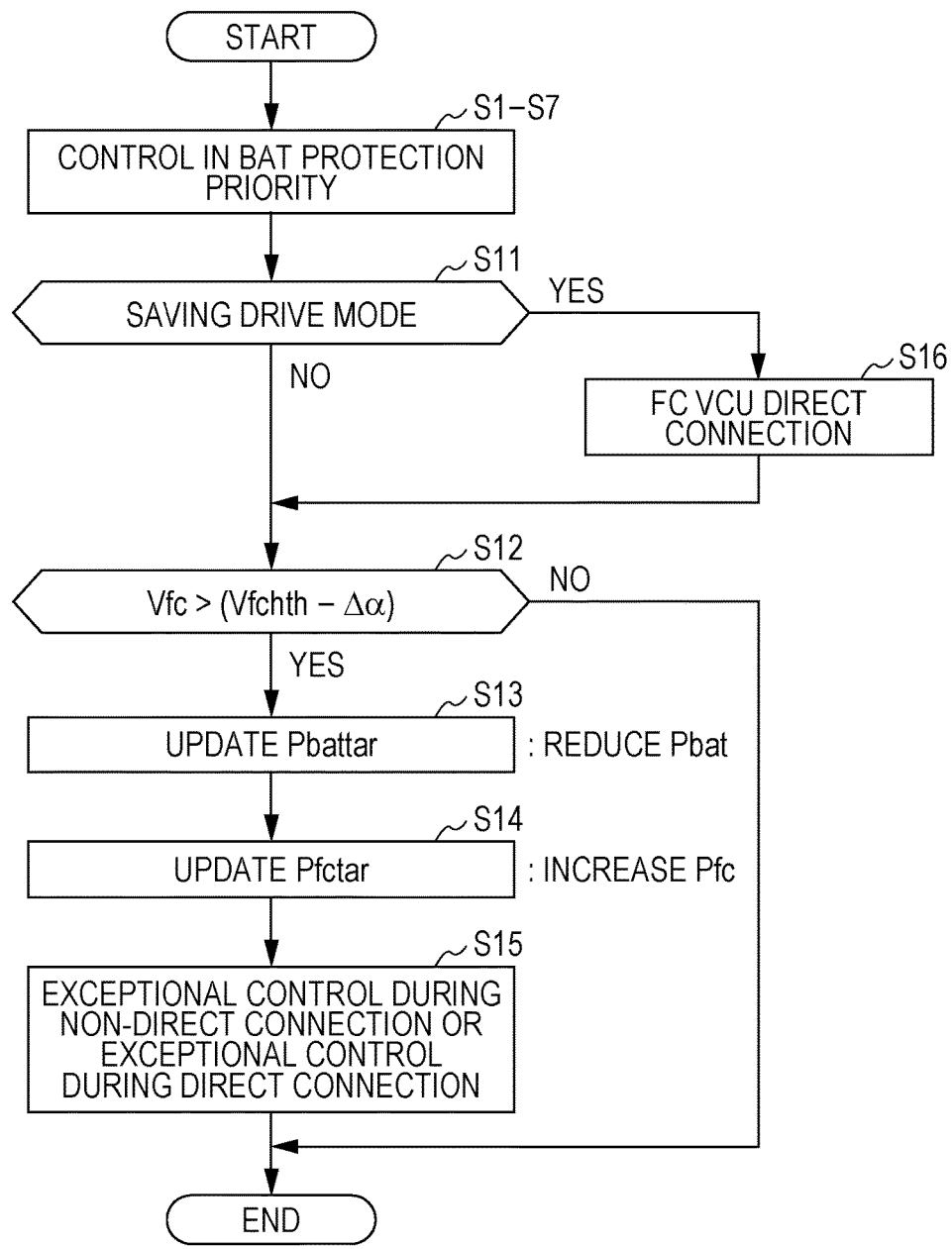
FIG. 9 is a flowchart of assistance in explaining operation of the exceptional control (during the direct connection of the fuel cell and during the non-direct connection thereof).

2-2-2) Description of Control During FC VCU Direct Connection/FC High Voltage Protection In the flowchart of FIG. 9, if a result of determination at step S11 shows the saving driving mode in which the energy saving mode switch is ON (step S11: YES), at step S16, in order that a switching loss of the FC converter 24 has a zero value, a switching operation of the FC converter 24 is stopped to improve system efficiency.

In this case, If a determination at step S12 is affirmative {Vfc>(Vfchth−Δα), step S12: YES}, after the processing of the above-mentioned steps S13 and S14, at step S15, the state is switched from a state of the general control illustrated in FIG. 2A to a state of exceptional control during direct connection illustrated in FIG. 2C, which is capable of FC high voltage protection control.

Figure 2C:
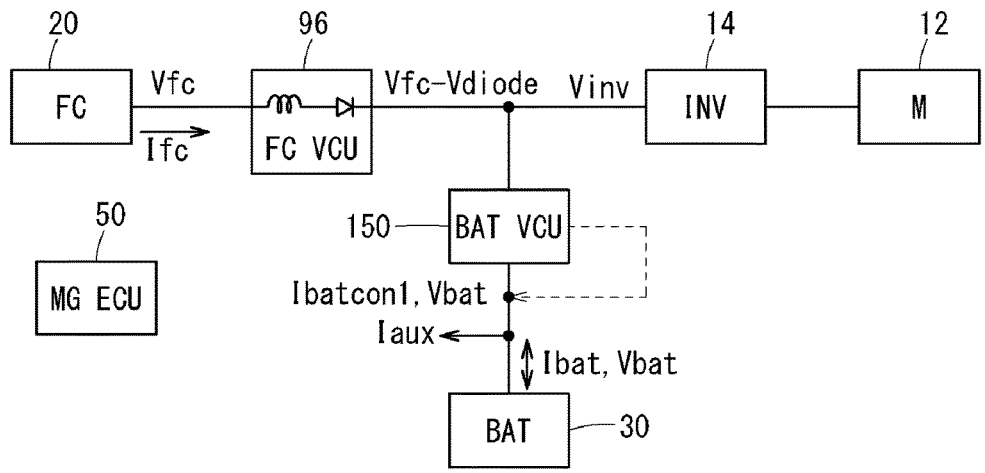
FIG. 2C is a circuit diagram of assistance in explaining exceptional control during direct connection (control in fuel cell high voltage protection).

As can be seen from a connection state of FIG. 2C, the FC VCU 96 (the FC converter 24) enters a direct connection state, and a voltage Vfc−Vdiode≈Vfc (Vfc>>Vdiode) obtained by subtracting a forward voltage Vdiode of the diode of the FC converter 24 from the FC voltage Vfc of the FC 20 is applied to the inverter 14, as the inverter terminal voltage Vinv as the secondary side voltage.

In this case, the BAT VCU 150 controls the battery current Ibat so that the battery current Ibat reaches the target battery power Pbattar reduced at step S13. During the direct connection, the FC current Ifc increases by the amount of reduction in the battery current Ibat, and thus, the FC voltage Vfc decreases along the IV characteristic 21, and thereby, the high voltage deterioration in the FC 20 is prevented.

During the direct connection (step S11: YES→step S16), if at step S12 a determination is made that the FC voltage Vfc is lower than the FC high voltage threshold Vfcth−Δα, it is not necessary to take into account the high voltage deterioration in the FC 20, and thus, the processing is ended. In this case, the general control (the control in the battery protection priority+the saving driving mode) in the direct connection state illustrated in FIG. 2C is continued.

In the above-mentioned sections 2-2-1) control during FC VCU non-direct connection/FC high voltage protection, and 2-2-2) control during FC VCU direct connection/FC high voltage protection, at step S12, a determination is made as to whether or not the FC voltage Vfc is higher than the FC high voltage threshold (Vfcth−Δα) (Vfc>Vfchth−Δα), and thereby, a necessity for the FC high voltage protection control is determined. The embodiment is not limited to this control, and a determination may be made that the FC high voltage protection control is necessary, when the FC vehicle 10 is in any of the following driving states 1 to 3.

The driving state 1: a driving state until completion of warm-up of the FC 20 during activation after a main power switch (not illustrated but corresponding to an ignition switch of a conventional internal combustion engine vehicle) is turned on; the driving state 2: a driving state during stop after the main power switch (not illustrated) is turned off; or the driving state 3: a driving state during idling of the FC vehicle 10.

In the driving states 1 to 3, the FC voltage Vfc is likely to enter a deterioration proceeding region where the FC voltage Vfc exceeds the high voltage threshold Vfchth (or is lower than a low current threshold Ifcltch), and thus, even such a simple determination enables protecting the FC 20 with reliability.

The completion of the warm-up can be determined by checking the present temperature of the FC 20 or the present IV characteristic 21, the stop time after the OFF state can be determined as time until completion of scavenging or the like, and the idling time can be determined as the time when the vehicle speed Vs is 0 [km/h].

2-3) Description of Exceptional Control (Control in Battery Protection Priority+FC High Power Protection)

2-3-1) Description of Differential Power (FC High Power Protection) Control

Next, description will be given with reference to a flowchart of FIG. 10 and a time chart of FIG. 11 with regard to the differential power (FC high power protection) control.

The MG ECU 50 performs the above-mentioned general control (the control in the battery protection priority) at steps S1 to S7.

Then, at step S21, a difference (a FC power difference) Psubfc (Psubfc=Pfcuplim−Pfc) between the present FC upper limit power value Pfcuplim and the present FC power (actual FC power) Pfc is calculated. Moreover, at step S21, during discharge of the battery 30, a difference (a battery power difference) Psubbat (Psubbat=Pbatuplim−Pbat) between the present battery upper limit power value Pbatuplim and the present battery power (actual battery power) Pbat is calculated, whereas during charge of the battery 30, a difference (a battery power difference) Psubbat=|Pbatlwlim−Pbat| (where || indicates an absolute value) between the present battery lower limit power Pbatlwlim and the present battery power (actual battery power) Pbat is calculated.

Then, further, at step S21, a determination is made as to whether or not the FC power difference Psubfc is larger than the battery power difference Psubbat (Psubfc>Psubbat).

If the FC power difference Psubfc is larger than the battery power difference Psubbat (step S21: YES), the FC power Pfc is judged as having an allowance, and a determination is made that it is not necessary to take into account the protection of the FC 20. At step S22, the general control for preventing the over discharge and overcharge of the battery 30 and protecting the battery 30 (FIG. 2A) is continued.

Meanwhile, if a result of difference determination at step S21 shows that the FC power difference Psubfc is smaller than the battery power difference Psubbat (step S21: NO), the FC power Pfc is judged as being close to the FC upper limit power value Pfcuplim and having a small amount of allowance, and a determination is made that it is necessary to take into account the protection of the FC 20.

In this case, at step S23, the FC target power Pfctar is updated to a small value.

Then, at step S24, exceptional control during high power is performed in order to perform prevention of high power deterioration of the FC 20 such that the FC power Pfc does not exceed the FC upper limit power value Pfcuplim.

In the exceptional control during high power, as illustrated in FIG. 2B, the MG ECU 50 directly controls the FC current Ifc as the primary side current of the FC converter 24 or the FC voltage Vfc as the primary side voltage of the FC converter 24 by the FC converter ECU 26 of the FC VCU 96 so that the FC power Pfc does not exceed the FC upper limit power value Pfcuplim.

Moreover, in the exceptional control during high power, at the same time, the MG ECU 50 controls the inverter terminal voltage Vinv as the secondary side voltage by the BAT converter 34 of the BAT VCU 150 in order to ensure the inverter terminal power Pinv as electric power required for the motor load of the drive system 1000.

Description will be given with reference to the time chart of FIG. 11 with regard to the exceptional control during high power, which performs the prevention of the high power deterioration of the FC 20.

In a time region where a FC power difference Pfcsub (Pfcsub=Pfcuhlim−Pfc) indicated by a broken line is larger than a battery power difference Pbatsub (Pbatsub=Pbatuplim−Pbat) indicated by a solid line, such as during idling before time t11 or during idling after time t15, the FC power Pfc has an allowance. In this case, in the above-mentioned circuit connection state of FIG. 2A, the general control (the control in the battery protection priority) is performed in which the BAT VCU 150 controls the voltage (the battery voltage Vbat) or the current (Ibatcon1) on the battery 30 side as the primary side.

Figure 11:
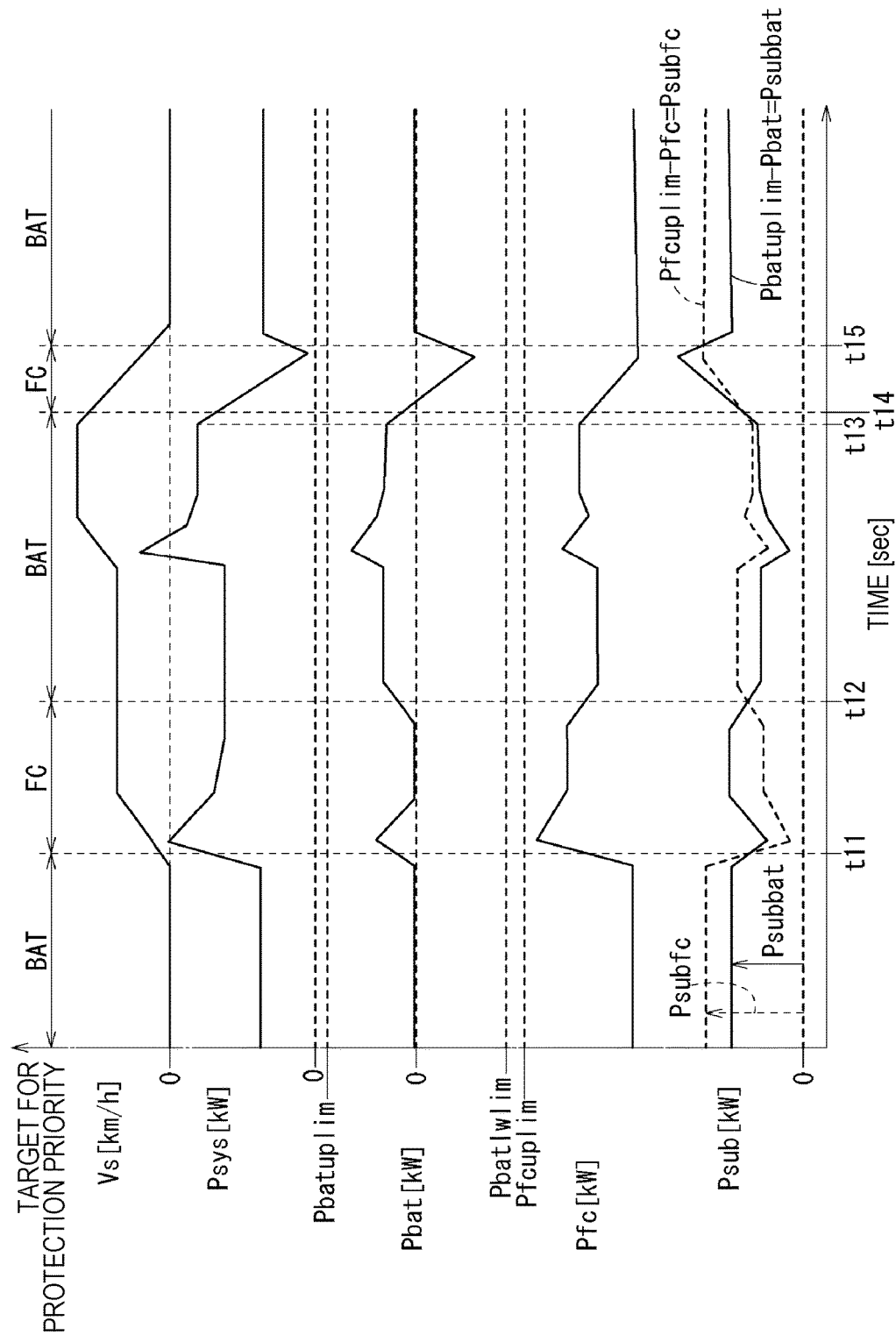
FIG. 11 is a time chart of assistance in explaining the operation of the exceptional control (the large power protection of the fuel cell).

Note that in the time chart of FIG. 11, during the idling before the time t11 or during the idling after the time t15, auxiliary machinery power Paux of the air conditioner or the like is compensated by the FC power Pfc, and it is not necessary to take into account the high voltage deterioration of the FC 20, whereas during idling (before the time t1 or after the time t2) in the time chart of FIG. 4, the requested system power Psysreq has a substantially zero value, and high voltage deterioration protection control is performed.

Further, in a time region between time t12 and time t14, during constant speed traveling under a relatively high-speed traveling condition or during relatively sudden acceleration under the relatively high-speed traveling condition, the amount of delivery of the battery power Pbat increases taking into account high speed adaptability of discharge power to the motor load of the battery 30, and thus, also in this time region, the FC power difference Pfcsub (Pfcsub=Pfcuhlim−Pfc) is larger than the battery power difference Pbatsub (Pbatsub=Pbatuplim−Pbat). Therefore, also in this case, in the circuit connection state of FIG. 2A, the general control (the control in the battery protection priority) is performed in which the BAT VCU 150 controls the voltage (the battery voltage Vbat) or the current (Ibatcon1) on the battery 30 side as the primary side.

Further, during slow acceleration start or during relatively constant-speed traveling in a time region between time t11 and time t12, or during slow deceleration stop in a time region between time t14 and time t15, or at other times, the FC power difference Pfcsub (Pfcsub=Pfcuhlim−Pfc) is smaller than the battery power difference Pbatsub (Pbatsub=Pbatuplim−Pbat), and thus, in the circuit connection state of FIG. 2B, the exceptional control during high power (FC protection temporary priority) is performed in which the FC converter ECU 26 of the FC VCU 96 directly controls the FC current Ifc as the primary side current of the FC converter 24 or the FC voltage Vfc as the primary side voltage of the FC converter 24 so that the FC power Pfc does not exceed the FC upper limit power value Pfcuplim.

2-3-2) Description of Single Power (FC High Power Protection) Control

Next, description will be given with reference to a flowchart of FIG. 12 with regard to operation of a simpler procedure of exceptional control (control in battery protection priority+FC high power protection).

Figure 10:
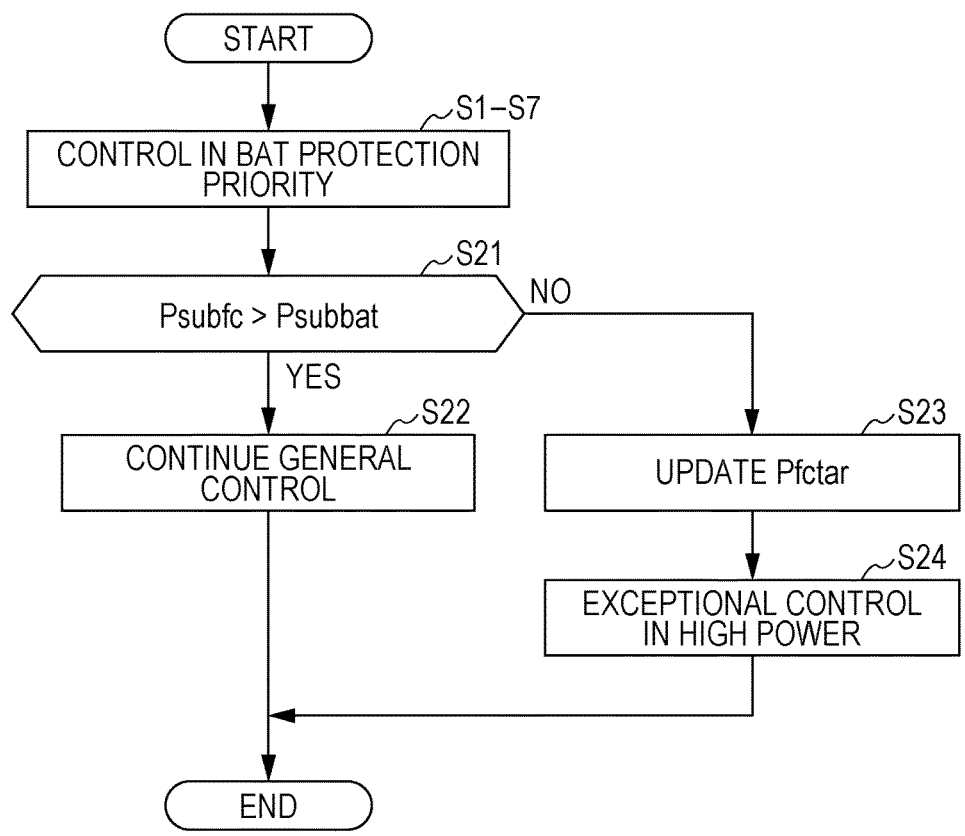
FIG. 10 is a flowchart of assistance in explaining operation of the exceptional control (the large power protection of the fuel cell).
Figure 12:
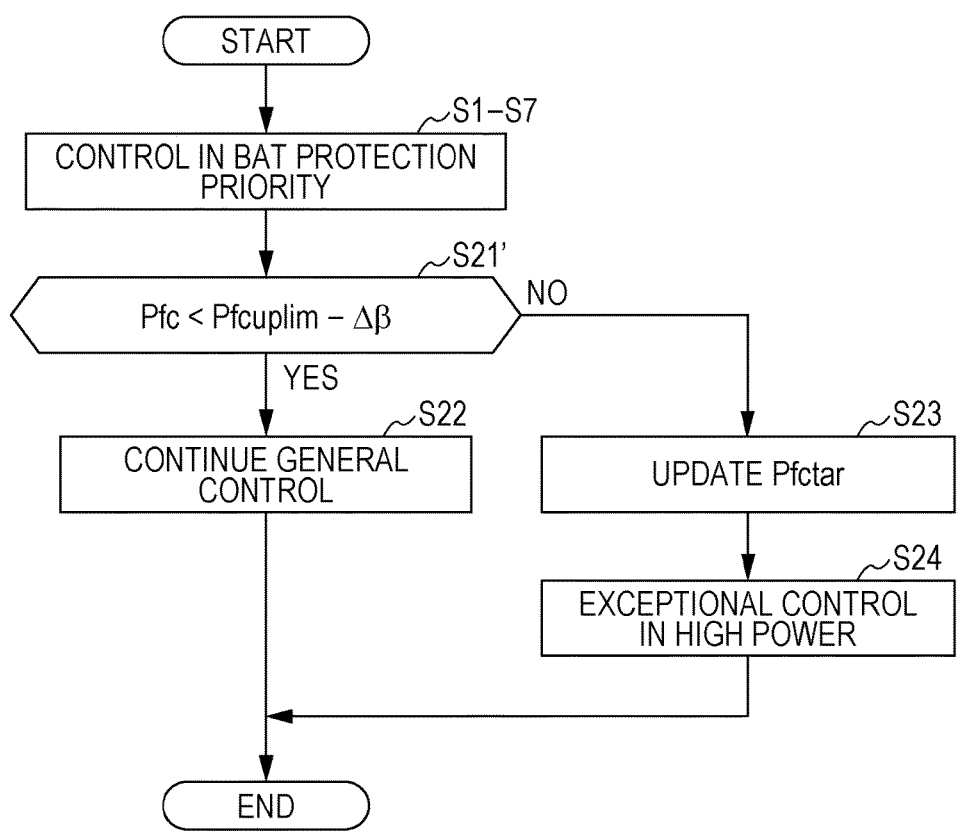
FIG. 12 is a flowchart of assistance in explaining operation of another exceptional control (the large power protection of the fuel cell).

Processing of the flowchart of FIG. 12 is different from the processing of the flowchart of FIG. 10 only in that a determination process of step S21 is changed to a determination process of step S21'.

At step S21', a determination is made as to whether or not the present FC power Pfc is smaller than a value (Pfcuplim−Δβ) obtained by subtracting an allowance (or a margin) Δβ from the FC upper limit power value Pfcuplim.

If the present FC power Pfc is smaller than the value (Pfcuplim−Δβ) obtained by subtracting the allowance (or the margin) Δβ from the FC upper limit power value Pfcuplim {Pfc<(Pfcuplim−Δβ), step S21': YES}, the FC power Pfc is judged as having an allowance, and in the circuit connection state of FIG. 2A, the general control (battery priority control) is continued.

Meanwhile, if the present FC power Pfc is equal to or greater than the value obtained by subtracting the allowance Δβ from the FC upper limit power value Pfcuplim {Pfc≥(Pfcuplim−Δβ), step S21': NO}, the present FC power Pfc has no allowance. Thus, at step S23 mentioned above, the target FC power Pfctar is updated to a small value, and at step S24, in the circuit connection state of FIG. 2B, the exceptional control during high power is performed, and thereby, control is performed so that the FC power Pfc does not exceed the FC upper limit power value Pfcuplim, thus preventing the deterioration or the like in the FC 20.

[2] Conclusion of Exceptional Control (Control in Battery Protection Priority+Control in FC Protection Temporary Priority)]

In the above-mentioned sections 2-2-1) control during FC VCU non-direct connection/FC high voltage protection, 2-2-2) control during FC VCU direct connection/FC high voltage protection, 2-3-1) differential power (FC high power protection) control, and 2-3-2) single power (FC high power protection) control, in the general control (the control in the battery protection priority) of the FC vehicle 10, a fuel cell protection determination step (step S12 of FIG. 9, step S21 of FIG. 10, step S21' of FIG. 12) determines whether or not the FC vehicle 10 is in a driving state in which the protection (the high voltage protection or high power protection) of the FC 20 is necessary.

When a determination is made that the FC vehicle 10 is in the driving state in which the protection of the FC 20 is necessary, a priority protection temporary switching step (step S15 of FIG. 9, step S24 of FIGS. 10 and 12) is performed. This step involves updating the target FC power Pfctar (step S14 of FIG. 9, step S23 of FIGS. 10 and 12), and updating the target battery power Pbattar (step S13 of FIG. 9) so that the updated target FC power Pfctar is reached.

Thus, when a determination is made that the FC vehicle 10 is in the driving state in which the priority protection of the FC 20 is necessary, in the driving state, the priority of an object to be protected is switched from the battery 30 to the FC 20, and thus, in the driving state in which the protection of the FC 20 is necessary, the FC 20 can be protected with reliability.

A situation where the battery 30 is protected by priority and a situation where the FC 20 is protected by priority change according to a change in the requested system power Psysreq due to a change in the driving state (or driving condition) of the FC vehicle 10. According to such a change, an object to be controlled (one of the FC 20 and the battery 30) which needs protection by higher priority can be controlled by priority, and both of the battery 30 and the FC 20 can be properly protected.

In this case, when the FC converter 24 as the second converter is a step-up converter to step up the FC voltage Vfc, the method may further include a saving driving mode determination step (step S11 of FIG. 9) of determining whether or not a saving driving mode of the FC vehicle 10 is selected; a direct connection step (step S16 of FIG. 9) of stopping a step-up operation of the FC converter 24 and forming a direct connection, when the saving driving mode is selected; a fuel cell protection determination step (step S12 of FIG. 9) of determining whether or not the FC vehicle 10 is in a driving state in which it is necessary to protect the FC 20; and a priority protection switching step (steps S13, S14 and S15 of FIG. 9) of updating the target FC power Pfctar, and updating the target battery power Pbattar so that the updated target FC power Pfctar is reached, when a determination is made that the FC vehicle 10 is in the driving state in which it is necessary to protect the FC 20.

Thus, when the saving driving mode is selected and the FC converter 24 is directly connected and a determination is made that the FC vehicle 10 is in the driving state in which it is necessary to protect the FC 20 (step S12: YES), in the driving state, the priority of the object to be protected is switched from the battery 30 to the FC 20. Thus, in the driving state in which it is necessary to protect the FC 20, the FC 20 can be protected with reliability.

Also in this case, a situation where the battery 30 is protected by priority and a situation where the FC 20 is protected by priority change according to a change in the requested system power Psysreq due to a change in the driving state (or driving condition) of the FC vehicle 10. According to such a change, the object to be controlled (one of the FC 20 and the battery 30) which needs protection by higher priority can be controlled by priority, and both of the battery 30 and the FC 20 can be properly protected.

By the direct connection of the FC converter 24, power consumption by a switching element for voltage conversion of the FC converter 24 is reduced, and the saving driving mode is performed.

To determine whether or not high voltage deterioration protection of the FC 20 is necessary, a determination may be made that the FC vehicle 10 is in the driving state in which it is necessary to protect the FC 20, when the FC vehicle 10 is in any one of an active state, a driving-stopped state and an idling state, besides when a determination is made that the actual FC voltage Vfc is higher than the high voltage threshold Vhchth. By any one of such determinations, a determination can be simply made as to whether the FC vehicle 10 is in the driving state in which the FC voltage Vfc may enter a deterioration proceeding region where the FC voltage Vfc exceeds the high voltage threshold Vfchth (or is lower than the low current threshold Ifclth), and the FC 20 can be protected with reliability.

The above-mentioned fuel cell protection determination step may monitor the actual FC power Pfc, and determine that the FC vehicle 10 is in the driving state in which it is necessary to protect the FC 20, when the monitored actual FC power Pfc may exceed the upper limit power threshold Pfcuplim at which it is necessary to protect the FC 20.

When the actual FC power Pfc exceeds the upper limit power threshold Pfcuplim, there is a fear of deterioration in the FC 20, and thus, in this case, the priority of the object to be protected is switched from the battery 30 to the FC 20, and thus, in the driving state in which it is necessary to protect the FC 20, the FC vehicle 10 can be protected with reliability.

The above-mentioned fuel cell protection determination step may monitor the actual FC power Pfc and detect, as the fuel cell side power difference Psubfc, a difference between the monitored actual FC power Pfc and the upper limit power threshold Pfcuplim at which it is necessary to protect the FC 20, and the fuel cell protection determination step may monitor the actual battery power Pbat and detect, as the battery side power difference Psubbat, a difference between the monitored actual battery power Pbat and the upper limit power threshold Pfcuplim at which it is necessary to protect the battery 30, and the fuel cell protection determination step may determine that the FC vehicle 10 is in the driving state in which it is necessary to protect the FC 20, when the fuel cell side power difference Psubfc is smaller than the battery side power difference Psubbat (Psubfc<Psubbat).

When the fuel cell side power difference Psubfc is smaller than the battery side power difference Psubbat, a control allowance of the FC 20 side is small, and thus, the priority is switched to the protection of the FC 20, and thereby, the FC 20 can be protected. Conversely, when the fuel cell side power difference Psubfc is larger than the battery side power difference Psubbat, the control allowance of the FC 20 side is large, and thus, in a general manner, the battery 30 is protected by priority and control is continued.

Of course, it is to be understood that the present disclosure is not limited to the above-mentioned embodiments, and various constituent features may be adopted based on the contents of description in the specification.

There is provided a method for controlling a fuel cell vehicle according to the embodiment, wherein the method controls a fuel cell, a power accumulation device, a motor drive unit configured to drive a motor for generating traveling power, a first converter connected between the power accumulation device and the motor drive unit and configured to convert a voltage, and a second converter connected between the fuel cell and the motor drive unit and configured to convert a voltage, the method including: a power accumulation device target power calculation step of calculating target power of the power accumulation device; a power accumulation device power control step of causing the first converter to control power of the power accumulation device, based on the target power of the power accumulation device; and a fuel cell power control step of controlling power of the fuel cell so that the power of the power accumulation device and the power of the fuel cell satisfy requested system power of the entire fuel cell vehicle.

According to the embodiment, the first converter controls by priority (or directly controls) the power of the power accumulation device, based on the target power of the power accumulation device, and the power of the fuel cell is controlled (or is indirectly controlled) so that the power of the power accumulation device and the power of the fuel cell satisfy the requested system power of the entire fuel cell vehicle. This enables preventing overcharge and over discharge of the power accumulation device, while satisfying the requested system power of the entire fuel cell vehicle.

In this case, the method further may include a motor drive unit terminal voltage control step of causing the second converter to control a requested motor drive unit terminal voltage based on a request from the motor. This enables ensuring drivability of the fuel cell vehicle, while protecting the power accumulation device by priority.

In this case, the method may further include a fuel cell protection determination step of determining whether or not the fuel cell vehicle is in a driving state in which it is necessary to protect the fuel cell; and a priority protection switching step of updating target power of the fuel cell, and updating the target power of the power accumulation device so that the updated target power of the fuel cell is reached, when a determination is made that the fuel cell vehicle is in the driving state in which it is necessary to protect the fuel cell.

According to the embodiment, when a determination is made that the fuel cell vehicle is in the driving state in which it is necessary to protect the fuel cell, in the driving state, the priority of an object to be protected is switched from the power accumulation device to the fuel cell, and thus, in the driving state in which it is necessary to protect the fuel cell, the fuel cell can be protected with reliability.

A situation where the power accumulation device is protected by priority and a situation where the fuel cell is protected by priority change according to a change in the requested system power due to a change in the driving state (or driving condition) of the fuel cell vehicle. According to such a change, an object to be controlled (one of the power accumulation device and the fuel cell) which needs protection by higher priority can be controlled by priority, and both of the power accumulation device and the fuel cell can be properly protected.

Moreover, the second converter is used as a step-up converter to step up a fuel cell voltage, and the method may further include a saving driving mode determination step of determining whether or not a saving driving mode of the fuel cell vehicle is selected; a direct connection step of stopping a step-up operation of the second converter and forming a direct connection, when the saving driving mode is selected; a fuel cell protection determination step of determining whether or not the fuel cell vehicle is in a driving state in which it is necessary to protect the fuel cell; and a priority protection switching step of updating target power of the fuel cell, and updating the target power of the power accumulation device so that the updated target power of the fuel cell is reached, when a determination is made that the fuel cell vehicle is in the driving state in which it is necessary to protect the fuel cell.

According to the embodiment, when the saving driving mode is selected and the second converter is directly connected and a determination is made that the fuel cell vehicle is in the driving state in which it is necessary to protect the fuel cell, in the driving state, the priority of the object to be protected is switched from the power accumulation device to the fuel cell, and thus, in the driving state in which it is necessary to protect the fuel cell, the fuel cell can be protected with reliability.

A situation where the power accumulation device is protected by priority and a situation where the fuel cell is protected by priority change according to a change in the requested system power due to a change in the driving state (or driving condition) of the fuel cell vehicle. According to such a change, an object to be controlled (one of the power accumulation device and the fuel cell) which needs protection by higher priority can be controlled by priority, and both of the power accumulation device and the fuel cell can be properly protected.

When the second converter is stopped, power consumption by a switching element for voltage conversion in a switching state of the second converter is reduced, and thus, the fuel cell vehicle can travel in the saving driving mode.

In this case, the fuel cell protection determination step may determine that the fuel cell vehicle is in the driving state in which it is necessary to protect the fuel cell, when the fuel cell vehicle is in any one of driving states including a driving state until completion of warm-up of the fuel cell during activation after a main power switch is turned on, a driving state during stop after the main power switch is turned off, and a driving state during idling of the fuel cell.

According to the embodiment, a determination can be simply made as to whether an actual voltage of the fuel cell may enter a deterioration proceeding region where the actual voltage of the fuel cell exceeds a high voltage threshold (or is lower than a low current threshold), and the fuel cell can be protected with reliability.

The fuel cell protection determination step may monitor actual power of the fuel cell, and determine that the fuel cell vehicle is in the driving state in which it is necessary to protect the fuel cell, when the monitored actual power of the fuel cell may exceed an upper limit power threshold at which it is necessary to protect the fuel cell.

According to the embodiment, when the actual power of the fuel cell exceeds the upper limit power threshold, there is a fear of deterioration in the fuel cell, and thus, in this case, the priority of the object to be protected is switched from the power accumulation device to the fuel cell, and thus, in the driving state in which it is necessary to protect the fuel cell, the fuel cell can be protected with reliability.

Further, the fuel cell protection determination step may monitor actual power of the fuel cell and detect, as a fuel cell side power difference, a difference between the monitored actual power of the fuel cell and an upper limit power threshold at which it is necessary to protect the fuel cell, and the fuel cell protection determination step may monitor actual power of the power accumulation device and detect, as a power accumulation device side power difference, a difference between the monitored actual power of the power accumulation device and an upper limit power threshold at which it is necessary to protect the power accumulation device, and the fuel cell protection determination step may determine that the fuel cell vehicle is in the driving state in which it is necessary to protect the fuel cell, when the fuel cell side power difference is smaller than the power accumulation device side power difference.

According to the embodiment, when the fuel cell side power difference is smaller than the power accumulation device side power difference, a control allowance of the fuel cell side is small, and thus, the priority is switched to the protection of the fuel cell, and thereby, the fuel cell can be protected. Conversely, when the fuel cell side power difference is larger than the power accumulation device side power difference, the control allowance of the fuel cell side is large, and thus, in a general manner, the power accumulation device may be protected by priority.

There is provided a fuel cell vehicle according to the embodiment including: a fuel cell, a power accumulation device, a motor drive unit configured to drive a motor for generating traveling power, a first converter connected between the power accumulation device and the motor drive unit and configured to convert a voltage, and a second converter connected between the fuel cell and the motor drive unit and configured to convert a voltage, the fuel cell vehicle including: a power accumulation device target power calculator configured to calculate target power of the power accumulation device; a power accumulation device power controller configured to cause the first converter to control power of the power accumulation device, based on the target power of the power accumulation device; and a fuel cell power controller configured to control power of the fuel cell so that the power of the power accumulation device and the power of the fuel cell satisfy requested system power of the entire fuel cell vehicle.

According to the embodiment, the first converter controls by priority (or directly controls) the power of the power accumulation device, based on the target power of the power accumulation device, and the power of the fuel cell is controlled (or is indirectly controlled) so that the power of the power accumulation device and the power of the fuel cell satisfy the requested system power of the entire fuel cell vehicle. This enables preventing overcharge and over discharge of the power accumulation device, while satisfying the requested system power of the entire fuel cell vehicle.

There is provided a fuel cell vehicle according to the embodiment including: a fuel cell, a power accumulation device, a motor drive unit configured to drive a motor for generating traveling power, a first converter connected between the power accumulation device and the motor drive unit and configured to convert a voltage, and a second converter connected between the fuel cell and the motor drive unit and configured to convert a voltage, wherein the first converter controls a primary side voltage of the first converter, and the second converter controls a secondary side voltage of the second converter.

According to the embodiment, the first converter controls a power accumulation device voltage as a primary side voltage of the power accumulation device, and the second converter controls a motor drive unit terminal voltage as a secondary side voltage of the power accumulation device. This enables ensuring drivability, while protecting the power accumulation device.

According to the embodiment, the first converter controls by priority (or directly controls) the power of the power accumulation device, based on the target power of the power accumulation device, and the power of the fuel cell is (indirectly) controlled so that the power of the power accumulation device and the power of the fuel cell satisfy the requested system power of the entire fuel cell vehicle. This enables preventing overcharge and over discharge of the power accumulation device, while satisfying the requested system power of the entire fuel cell vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell vehicle, comprising:
　calculating total system power for the fuel cell vehicle;
　calculating power accumulation device target power;
　calculating fuel cell target power, the power accumulation device target power and the fuel cell target power satisfying the total system power;

controlling a first converter to regulate power of a power accumulation device based on the power accumulation device target power, the first converter being provided between the power accumulation device and a motor driver to convert a voltage discharged by the power accumulation device into a voltage supplied to the motor driver and to convert a voltage outputted by the motor driver to a voltage supplied to the power accumulation device, the motor driver being to drive a motor to generate travelling power; and controlling a second converter to regulate power generated by a fuel cell based on the fuel cell target power, the second converter being provided between the fuel cell and the motor driver to convert a voltage generated by the fuel cell to a voltage supplied to the motor driver, wherein the power accumulation device target power is calculated prior to calculation of the fuel cell target power to prioritize control of the power accumulation device over control of the fuel cell.

2. The method according to claim 1, further comprising:
controlling the second converter to regulate a requested motor driver terminal voltage based on a request from the motor.

3. The method according to claim 1, further comprising:
determining whether or not the fuel cell vehicle is in a driving state in which it is necessary to protect the fuel cell; and
updating the fuel cell target power to reach a first value, and updating the power accumulation device target power, so that the fuel cell target power reaches the first value, when a determination is made that the fuel cell vehicle is in the driving state in which it is necessary to protect the fuel cell.

4. The method according to claim 3, wherein the determination is made that the fuel cell vehicle is in the driving state in which it is necessary to protect the fuel cell, when the fuel cell vehicle is in any one of driving states including:
a driving state until completion of warm-up of the fuel cell during activation after a main power switch is turned on;
a driving state during stop after the main power switch is turned off; and
a driving state during idling of the fuel cell.

5. The method according to claim 3, further comprising monitoring actual power of the fuel cell, wherein the determination is made that the fuel cell vehicle is in the driving state in which it is necessary to protect the fuel cell, when the actual power of the fuel cell may exceed an upper limit power threshold at which it is necessary to protect the fuel cell.

6. The method according to claim 3, further comprising:
monitoring actual power of the fuel cell;
detecting, as a fuel cell side power difference, a difference between the actual power of the fuel cell and an upper limit power threshold at which it is necessary to protect the fuel cell;
monitoring actual power of the power accumulation device; and
detecting, as a power accumulation device side power difference, a difference between the actual power of the power accumulation device and an upper limit power threshold at which it is necessary to protect the power accumulation device, wherein
the determination is made that the fuel cell vehicle is in the driving state in which it is necessary to protect the fuel cell, when the fuel cell side power difference is smaller than the power accumulation device side power difference.

7. The method according to claim 1, wherein the second converter is used as a step-up converter to step up a fuel cell voltage, the method further comprising:
determining whether or not a saving driving mode of the fuel cell vehicle is selected;
stopping a step-up operation of the second converter and forming a direct connection, when the saving driving mode is selected;
determining whether or not the fuel cell vehicle is in a driving state in which it is necessary to protect the fuel cell; and
updating the fuel cell target power to reach a second value, and updating the power accumulation device target power so that the fuel cell target power reaches the second value, when a determination is made that the fuel cell vehicle is in the driving state in which it is necessary to protect the fuel cell.

8. The method according to claim 1, further comprising:
calculating an upper limit and a lower limit of the power accumulation device target power based on a temperature of the power accumulation device and a remaining capacitance of the power accumulation device,
wherein the power accumulation device target power is calculated such that the power accumulation device target power is between the upper limit and the lower limit.

9. A fuel cell vehicle comprising:
a fuel cell;
a power accumulation device;
a motor to generate traveling power;
a motor driver to drive the motor;
a first converter connected between the power accumulation device and the motor driver to convert a voltage discharged by the power accumulation device into a voltage supplied to the motor driver and to convert a voltage outputted by the motor driver to a voltage supplied to the power accumulation device; and
a second converter connected between the fuel cell and the motor driver to convert a voltage generated by the fuel cell into a voltage supplied to the motor driver;
a system power calculator to calculate total system power for the fuel cell vehicle;
a power accumulation device target power calculator to calculate power accumulation device target power;
a fuel cell target power calculator to calculate fuel cell target power, the power accumulation device target power and the fuel cell target power satisfying the total system power;
a power accumulation device power controller to control the first converter to regulate power of the power accumulation device based on the power accumulation device target power; and
a fuel cell power controller to control the second converter to regulate power generated by the fuel cell based on the fuel cell target power, wherein
the power accumulation device target power calculator calculates the power accumulation device target power prior to calculation of the fuel cell target power such that control by the power accumulation device power controller is prioritized over control by the fuel cell power controller.

10. The fuel cell vehicle according to claim 9,
wherein the power accumulation device target power calculator calculates an upper limit and a lower limit of the power accumulation device target power based on a temperature of the power accumulation device and a remaining capacitance of the power accumulation device, and
wherein the power accumulation device target power calculator calculates the power accumulation device target power such that the power accumulation device target power is between the upper limit and the lower limit.

11. A method for controlling a fuel cell vehicle, comprising:
calculating total system power for the fuel cell vehicle;
calculating power accumulation device target power;
calculating fuel cell target power, the power accumulation device target power and the fuel cell target power satisfying the total system power;
controlling a first converter to regulate power of a power accumulation device based on the power accumulation device target power, the first converter being provided between the power accumulation device and a motor driver to convert a voltage discharged by the power accumulation device into a voltage supplied to the motor driver and to convert a voltage outputted by the motor driver to a voltage supplied to the power accumulation device, the motor driver being to drive a motor to generate travelling power;
controlling a second converter to regulate power generated by a fuel cell based on the fuel cell target power, the second converter being provided between the fuel cell and the motor driver to convert a voltage generated by the fuel cell to a voltage supplied to the motor driver;
determining whether or not the fuel cell vehicle is in a driving state in which it is necessary to protect the fuel cell; and
updating the fuel cell target power to reach a first value, and updating the power accumulation device target power, so that the fuel cell target power reaches the first value, when a determination is made that the fuel cell vehicle is in the driving state in which it is necessary to protect the fuel cell.

12. The method according to claim 11, wherein the determination is made that the fuel cell vehicle is in the driving state in which it is necessary to protect the fuel cell, when the fuel cell vehicle is in any one of driving states including:
a driving state until completion of warm-up of the fuel cell during activation after a main power switch is turned on;
a driving state during stop after the main power switch is turned off; and
a driving state during idling of the fuel cell.

13. The method according to claim 11, further comprising monitoring actual power of the fuel cell, wherein the determination is made that the fuel cell vehicle is in the driving state in which it is necessary to protect the fuel cell, when the actual power of the fuel cell may exceed an upper limit power threshold at which it is necessary to protect the fuel cell.

14. The method according to claim 11, further comprising:
monitoring actual power of the fuel cell;
detecting, as a fuel cell side power difference, a difference between the actual power of the fuel cell and an upper limit power threshold at which it is necessary to protect the fuel cell;
monitoring actual power of the power accumulation device; and
detecting, as a power accumulation device side power difference, a difference between the actual power of the power accumulation device and an upper limit power threshold at which it is necessary to protect the power accumulation device, wherein
the determination is made that the fuel cell vehicle is in the driving state in which it is necessary to protect the fuel cell, when the fuel cell side power difference is smaller than the power accumulation device side power difference.

15. A method for controlling a fuel cell vehicle, comprising:
calculating total system power for the fuel cell vehicle;
calculating power accumulation device target power;
calculating fuel cell target power, the power accumulation device target power and the fuel cell target power satisfying the total system power;
controlling a first converter to regulate power of a power accumulation device based on the power accumulation device target power, the first converter being provided between the power accumulation device and a motor driver to convert a voltage discharged by the power accumulation device into a voltage supplied to the motor driver and to convert a voltage outputted by the motor driver to a voltage supplied to the power accumulation device, the motor driver being to drive a motor to generate travelling power; and
controlling a second converter to regulate power generated by a fuel cell based on the fuel cell target power, the second converter being provided between the fuel cell and the motor driver to convert a voltage generated by the fuel cell to a voltage supplied to the motor driver,
wherein the second converter is used as a step-up converter to step up a fuel cell voltage, the method further comprising:
determining whether or not a saving driving mode of the fuel cell vehicle is selected;
stopping a step-up operation of the second converter and forming a direct connection, when the saving driving mode is selected;
determining whether or not the fuel cell vehicle is in a driving state in which it is necessary to protect the fuel cell; and
updating the fuel cell target power to reach a second value, and updating the power accumulation device target power so that the fuel cell target power reaches the second value, when a determination is made that the fuel cell vehicle is in the driving state in which it is necessary to protect the fuel cell.

* * * * *